(12) United States Patent
Erickson et al.

(10) Patent No.: US 11,969,945 B2
(45) Date of Patent: Apr. 30, 2024

(54) AUTOMATED HANDLING BASED ON PART IDENTIFIER AND LOCATION

(71) Applicant: Hewlett-Packard Development Company, L.P., Spring, TX (US)

(72) Inventors: Kristopher J. Erickson, Palo Alto, CA (US); Jarrid Wittkopf, Palo Alto, CA (US); Rafael Ballagas, Palo Alto, CA (US); David Wayne George, Palo Alto, CA (US); Lihua Zhao, Palo Alto, CA (US); William J. Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 247 days.

(21) Appl. No.: 17/414,803

(22) PCT Filed: Jun. 18, 2019

(86) PCT No.: PCT/US2019/037699
§ 371 (c)(1),
(2) Date: Jun. 16, 2021

(87) PCT Pub. No.: WO2020/256701
PCT Pub. Date: Dec. 24, 2020

(65) Prior Publication Data
US 2022/0097305 A1    Mar. 31, 2022

(51) Int. Cl.
*B29C 64/379*    (2017.01)
*B29C 64/393*    (2017.01)
(Continued)

(52) U.S. Cl.
CPC .......... *B29C 64/379* (2017.08); *B29C 64/393* (2017.08); *B33Y 10/00* (2014.12);
(Continued)

(58) Field of Classification Search
CPC ..... B29C 64/379; B29C 64/393; B33Y 10/00; B33Y 40/20; B33Y 50/02
See application file for complete search history.

(56) References Cited

U.S. PATENT DOCUMENTS

| 8,668,423 B2 * | 3/2014 | Motonaga ........... F16H 19/0604 414/730 |
| 9,563,984 B2 | 2/2017 | Willis et al. |

(Continued)

FOREIGN PATENT DOCUMENTS

| KR | 20170098258 A | 8/2017 |
| WO | WO-2017197023 A1 | 11/2017 |

(Continued)

OTHER PUBLICATIONS

Maarouf, et al, A new heuristic algorithm for the 3d bin packing problem, In Innovations and Advanced Techniques in Systems, Computing Sciences and Software Engineering, pp. 342-345, Springer, Dordrecht, 2008.

(Continued)

*Primary Examiner* — Mark A Connolly
(74) *Attorney, Agent, or Firm* — Shook, Hardy & Bacon L.L.P.

(57) ABSTRACT

In one example in accordance with the present disclosure, a system is described. The system includes a reader to 1) read an identifier from a three-dimensional (3D) System printed object that includes a storage element and 2) read a location of the 3D printed object within a build material bed. An extractor of the system extracts, based on the identifier, a post processing operation to execute on the 3D printed object. A controller of the system controls a post processing operation based on extracted post processing operation information and the location.

14 Claims, 16 Drawing Sheets

(51) Int. Cl.
*B33Y 10/00* (2015.01)
*B33Y 40/00* (2020.01)
*B33Y 40/20* (2020.01)
*B33Y 50/00* (2015.01)
*B33Y 50/02* (2015.01)
*G06K 19/06* (2006.01)
*G06K 19/07* (2006.01)
*G06K 19/077* (2006.01)

(52) U.S. Cl.
CPC .............. *B33Y 40/20* (2020.01); *B33Y 50/02* (2014.12); *G06K 19/0723* (2013.01); *G06K 19/07758* (2013.01)

(56) References Cited

U.S. PATENT DOCUMENTS

| | | | |
|---|---|---|---|
| 9,656,428 | B2 | 5/2017 | Voris et al. |
| 9,937,702 | B1 | 4/2018 | Goss et al. |
| 10,226,916 | B2 | 3/2019 | Kozlak et al. |
| 2016/0067927 | A1 | 3/2016 | Voris et al. |
| 2017/0311164 | A1 | 10/2017 | Shin et al. |
| 2019/0126556 | A1 | 5/2019 | Levine et al. |
| 2020/0001536 | A1* | 1/2020 | DeSimone ............ B29C 64/295 |
| 2021/0224535 | A1* | 7/2021 | Sayers ...................... G06T 7/55 |

FOREIGN PATENT DOCUMENTS

| | | |
|---|---|---|
| WO | WO-2018140021 A1 | 8/2018 |
| WO | WO-2019014192 A1 | 1/2019 |

OTHER PUBLICATIONS

Weber, Austin, RFID on the Line, Feb. 1, 2006, www.assemblymag.com, 8 pages, Available at: https://www.assemblymag.com/articles/84504-rfid-on-the-line.

\* cited by examiner

AUTOMATED HANDLING BASED ON PART IDENTIFIER AND LOCATION

BACKGROUND

Additive manufacturing systems produce three-dimensional (3D) objects by building up layers of material. Some additive manufacturing systems are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
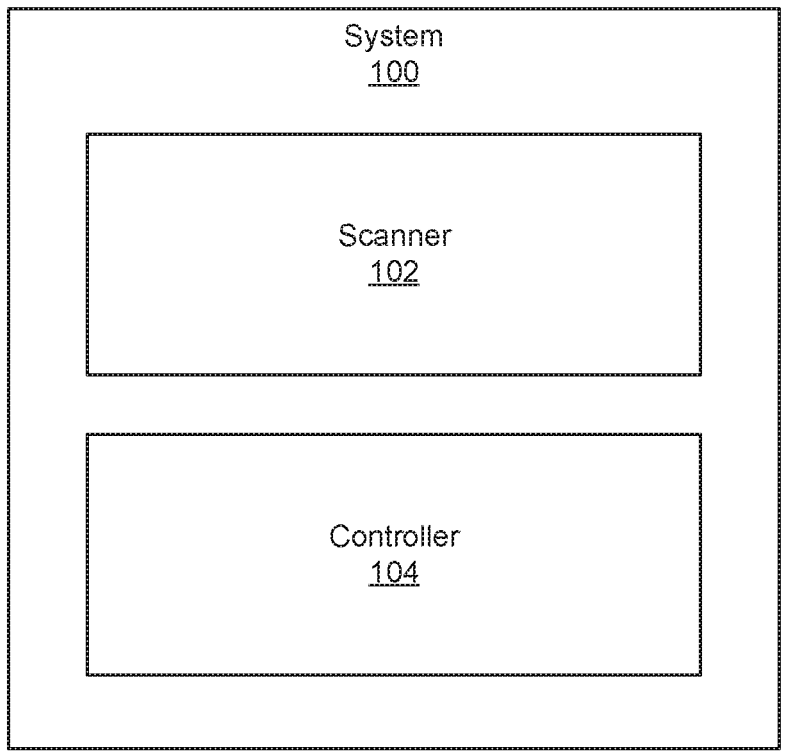
FIG. 1 is a block diagram of a system for reading print information from an embedded storage element, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems make a three-dimensional (3D) object through the solidification of layers of a build material. Additive manufacturing systems make objects based on data in a 3D model of the object generated, for example, with a computer-aided drafting (CAD) computer program product. The model data is processed into slices, each slice defining portions of a layer of build material that is to be solidified.

In one example, to form the 3D object, a build material, which may be powder, is deposited on a bed. A fusing agent is then dispensed onto portions of the layer of build material that are to be fused to form a layer of the 3D object. The system that carries out this type of additive manufacturing may be referred to as a powder and fusing agent-based system. The fusing agent disposed in the desired pattern increases the energy absorption of the underlying layer of build material on which the agent is disposed. The build material is then exposed to energy such as electromagnetic radiation. The electromagnetic radiation may include infrared light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Another way of 3D printing selectively applies binder to build material which glues particles of the build material together. In this example, a "green" part is prepared by selectively applying a binding agent to powdered build material. The green part is then removed from the printer and loaded into a sintering furnace. Sintering with gradually increasing temperature and using appropriate ambient pressure burns out the binding agent while simultaneously sintering particles with binding agent disposed thereon.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part.

In yet another example, the additive manufacturing process may involve using a light source to cure a liquid resin into a hard substance. Such an operation may be referred to as stereolithography.

While such additive manufacturing operations have greatly expanded manufacturing and development possibilities, further development may make the 3D printing process even more practical.

For example, as with all manufacturing processes, additive manufacturing is susceptible to process variation where different parts experience different manufacturing conditions. Moreover, through the distribution chain, different parts may be subject to different storage/handling conditions. That is to say, each product that is produced has its own unique lifecycle through conception, design, manufacturing, distribution, and use. It may be desirable to provide information related to the lifecycle of a part with the part itself, such that specific characteristics of that part can be determined, tracked, and utilized. The present specification provides such a mechanism.

For example, by attaching a storage element, such as a radio-frequency identification (RFID) chip to a part along with an embedded printed antenna (to extend read range), each 3D printed object can obtain a unique identity. This may be used throughout the lifecycle of the 3D printed object, allowing for unique interactions with, and functionalities for, the 3D printed object. For example, information or data about the 3D printed object can be tied to this identity, with that data coming from a variety of sources and interaction points during the 3D printed object lifecycle. In some examples, depending on the type of communication protocol used, a printed antenna may not be printed as the antenna may be disposed in the communication device itself.

In some examples, this information may be stored at a remote database. However, in some examples by utilizing an electronic tag, such as an RFID chip, some of that information can be stored on the 3D printed object itself. With an electronic protocol like RFID, the 3D printed object may be read by an appropriate reader at any time by the manufacturer, intermediary, or final user.

The use of an embedded storage element that includes at least an identifier for an associated 3D printed object and additional associated information (either in the storage element or on a database) coupled with the ease of scanning parts, enables a broad ecosystem of valuable part functionalities, especially as additional data about the 3D printed object can be added during the 3D printed object lifecycle. Such a system provides a wide variety of enabled functionalities including security and authentication of parts, intelligent redesign of parts, data collection on part usage, and automation of handling of parts.

Before a part is manufactured, certain information may be stored on a storage element which may be embedded in the 3D printed object itself. That is, information that indicates how a 3D printed object is to be formed may be acquired from the storage element that is ultimately stored in the 3D printed object. In some examples, a unique identifier for the 3D printed object may be provided by a third party, but is associated with the 3D printed object during an upstream operation. That is, it may be the case that the unique identifier is assigned via the manufacturer of the 3D printed object, or it may be received and incorporated into the 3D printed object manufacturer manufacturing stream.

Specifically, the present specification describes a system. The system includes a reader to 1) read an identifier from a three-dimensional (3D) printed object that includes a storage element and 2) read a location of the 3D printed object within a build material bed. An extractor of the system extracts, based on the identifier, a post processing operation to execute on the 3D printed object. The system also includes a controller to control a post processing operation based on extracted post processing operation information and the location.

The present specification also describes a method. According to the method, an identifier is read from a storage element disposed in a three-dimensional (3D) printed object. Post processing operation information for the 3D printed object and a location of the 3D printed object within a build material bed is extracted based on the identifier. A post processing operation is triggered based on the post processing operation information and the location.

In another example, the system includes a reader to 1) read an identifier from a three-dimensional (3D) printed object that includes a storage element and 2) read a location of the 3D printed object within a build material bed. The system also includes an extractor to extract from a database and based on the identifier 1) a post processing operation to execute on the 3D printed object and 2) post processing procedures. The system also includes a controller to control a post processing device based on extracted post processing operation information and the location and a post processing device to perform the post processing operation using the post processing parameters.

The present system and method enable a variety of functionalities including at least part authentication and security of parts, intelligent redesign of parts, collection part usage information, automated handling of parts, and curation of part interactions. These enabled functionalities may increase the use and efficacy of additive manufacturing and are difficult to achieve without both a created identity for a part and a facile mechanism for reading connected parts. By incorporating storage elements, such as RFID chips and an antenna, into 3D printed objects, these high value-added functionalities can be enabled through a singular approach.

Such systems and methods 1) provide a single tagging approach for 3D printed parts; 2) enhance security and authentication of 3D printed parts; 3) facilitate intelligent redesign and reconfiguring of 3D printed parts; 4) provide data gathering on part usage; 5) facilitate automation of handling of 3D printed objects; 6) allow for multiple 3D printed objects to be read simultaneously without direct line-of-sight (can be read through most non-metal materials) to the tag and through RF-transparent materials like polymers; 7) create a data-rich environment for each 3D printed object which can be added to or pulled from at any point during the object lifecycle which allows for numerous opportunities for extracting value from this data; and 8) are easily implementable. However, it is contemplated that the systems and methods disclosed herein may address other matters and deficiencies in a number of technical areas.

Product Lifecycle

In general, there are numerous stages of an object lifecycle between production and final usage. If RFID chips, or other storage elements, are incorporated into 3D printed objects during the print or post-processing operations, the 3D printed object may obtain an identifier. This identifier may have associated with it a large amount of information stored in a database. This information can include data which has been preconfigured prior to printing and information that is added during the lifecycle of the part. Data tied to this identifier may be read during different lifecycle stages and be acted upon by a person or machine.

In one example, the storage element, such as an RFID tag, may be used as a power source for other connected electronics (through a high-power interrogator) which may also be embedded in the 3D printed object. Accordingly, additional embedded powered sensor systems may be incorporated into 3D printed objects and be used for information gathering during the 3D printed object lifecycle.

As will be described below, the storage element may be incorporated into the part at different times. For example, an automated component placement system installed on the additive manufacturing system may place the storage element during the manufacturing process itself (in-situ placed chip). In another example, the chip may be placed during, or after, the part has been post-processed. Similarly, any antenna that may be placed may also be printed in situ or placed afterwards.

While specific reference is made to RFID storage elements, other types of communication storage/transmission elements may also be used including, low power wireless or ultra-high frequency wireless communication, near field communication, wireless communication etc.

Visual methods of part identification, such as via barcodes and quick response codes, may be difficult to implement as they may use a large, flat region for the code and high color contrast. Furthermore, optical detection of the codes uses a direct line-of-sight to the code, which may often not be possible during each portion of the lifecycle of a part.

Embedded Storage Element with Print Instructions

Turning now to the figures, FIGS. 1-5 describe systems and methods for storing print information on an embedded storage element, according to an example of the principles described herein. That is, FIGS. 1-5 describe the initialization where the 3D printed object identifier can have information associated with it that will inform actions which are taken during the other portions of the 3D printed object lifecycle by preconfiguring the storage element and the associated object identifier. As will be described below, the information may be onboard the storage element and may include the part number and other information. In some examples, the storage element may include just a unique identification of the 3D printed object. However, if a larger storage space tag is used, additional information could possibly be on-boarded onto the chip itself or a connected memory module.

As described above, the data about each 3D printed object, either in a database or onboard the storage element, may include information such as what the desired manufacturing conditions are, what print orientation is preferred, print packing information, desired proximity to other parts during printing, what post-processing the part should have, what testing it should undergo, how it fits into an assembly, what the final part destination is, CAD/design revision number for eventual re-order, or other information. The version number of a part can also be preconfigured, with the associated changes for the specific design being used.

Specifically, turning now to the figures, FIG. 1 is a block diagram of a system (100) for reading print information from an embedded storage element, according to an example of the principles described herein. As used in the present specification and in the appended claims, the term "powdered build material" or "build material" is meant to refer to any form of particulate material and may include various types of material including plastic, metal, and ceramic.

The system (100) includes a scanner (102). The scanner reads three-dimensional (3D) print information from a storage element that is to be embedded in a 3D printed object. That is, a 3D printed object may be formed by any number of additive manufacturing methods including those indicated above. Instructions are used to guide the additive manufacturing devices to carry out intended operations to form the 3D printed object. Moreover, as described above, a storage element is embedded into the 3D printed object for the storage of a variety of pieces of information relating to the 3D printed object. From this same storage element that is to be embedded into the 3D printed object, print information, including build instructions, may be read.

For example, there are a variety of conditions that may be prescribed for the printing of a 3D printed object and which may be relevant to certain final object characteristics. For example, a temperature and type of build material may affect the strength and/or flexibility of a 3D printed object. Accordingly, an object designer may intend for certain print parameters to be followed to ensure the resulting 3D printed object operates as intended. Accordingly, these print parameters and other print information may be associated with an identifier, which identifier is disposed on a storage element to be embedded into the 3D printed object itself. In another example, the print information itself may be stored on the storage element. By storing the identifier that maps to the print information, or by storing the print information itself, on the storage element which will ultimately be embedded into the 3D printed object, the print information is portable. That is, a manufacturer, rather than transporting the digital file associated with a 3D printed object which file may be large and difficult to transport, can store the information, or map to the information, via a small storage element that is to be embedded into the 3D printed object.

As described above, the print information that is read, either from the identifier or from a database, may be of a variety of types. For example, the print information may indicate print parameters to be used to form the 3D printed object. Examples of such print parameters include a print temperature, print orientation, print packing information, proximity to other parts, build layer thickness, and build layer composition. In this example the build layer composition may refer to the mixture of a build material of new product and recycled or reused product. Each of these print parameters may affect print quality. For example, a print temperature may affect the fusing/sintering of the build material which may affect the strength of the 3D printed part. As another example, print orientation may affect the resolution, or surface finish of the part. The packing information may refer to how tightly or loosely parts may be printed within a bed. Such packing information and the proximity of this part to other parts in the 3D build area may affect part geometric accuracy. For example, in an agent-based fusing system, due to thermal bleed, some of the heat energy from fused material may transfer to adjacent particles of build material and may semi-permanently adhere these adjacent particles to the fused portion which is to form the 3D printed object. If two 3D printed objects are printed too close to one another, the thermal bleed from one 3D printed object may alter the fusing of an adjacent part, which may affect the accuracy of the adjacent part's dimensions.

Build layer thickness may affect the resolution of the part. Accordingly, where a 3D printed object is intended to have a higher resolution, a smaller build layer thickness parameter may be used. Similarly, build material composition may affect the quality and/or strength of the 3D printed object with build material having a higher ratio of new, or raw, product may result in stronger pieces. In yet another example, the print information may be unrelated to print parameters. For example, the print information may include other information related to the 3D printed object such as file location, purpose/end use of the product etc.

While specific reference is made to particular pieces of print information that are stored on the storage element and read by the scanner, other types of print information may be included as well, which additional print information may include part identification information, printer identification information, batch information, etc. Moreover, in addition to print information, the storage element may also store other information as well. For example, information collected during printing, and even during post processing of the 3D printed object may be stored thereon.

The scanner (102) may be of a variety of types and may be selected based on the storage element. For example, the storage element may be a radio-frequency identification (RFID) tag. In this example, the scanner (102) may be an RFID scanner. In this example, the RFID tag receives electromagnetic energy from the RFID scanner (102) antenna. Then, using its own internal battery or energy harvested from the scanner (102), the tag sends radio waves back to the scanner (102). The scanner (102) picks up the RFID tag radio waves and decodes them into an identifier. Using an RFID tag and an RFID scanner (102) allow for reading/scanning without line-of-sight communication. That is, as described above, in some examples, the storage element is embedded into build material, i.e., the 3D printed object. In this example, the information stored on the RFID chip can be read by a scanner (102) through the body of the 3D printed object.

While particular reference is made to a particular scanner (102) such as one to read an RFID tag, a variety of types of scanners (102) may be implemented that rely on different communication protocol. For example, the scanner (102) may be an ultra-high frequency (UHF) scanner, a near-field communication scanner, and a wireless scanner among others.

The system (100) also includes a controller (104). The controller instructs the additive manufacturing device to form the 3D printed object based on print information read from the storage element. That is, as described above, the 3D print information may include things such as desired raw materials for the 3D printed object, environmental conditions to maintain during additive manufacturing, and a physical layout of the object relative to other objects during additive manufacturing, among others. Accordingly, the controller (104) controls the various components of the additive manufacturing device based on this information.

The controller (104) may also embed the storage element into the 3D printed object. That is, as described above, the storage element may be physically placed inside the 3D printed object such that it is readily accessible and always with the 3D printed object. The controller (104) may facilitate this embedding. Specifically, the controller (104) may temporarily pause printing to allow for the storage element to be placed. The controller (104) may also control the placement device which positions and embeds the storage element. The controller (104) may also resume printing on top of the storage element.

Figure 2:
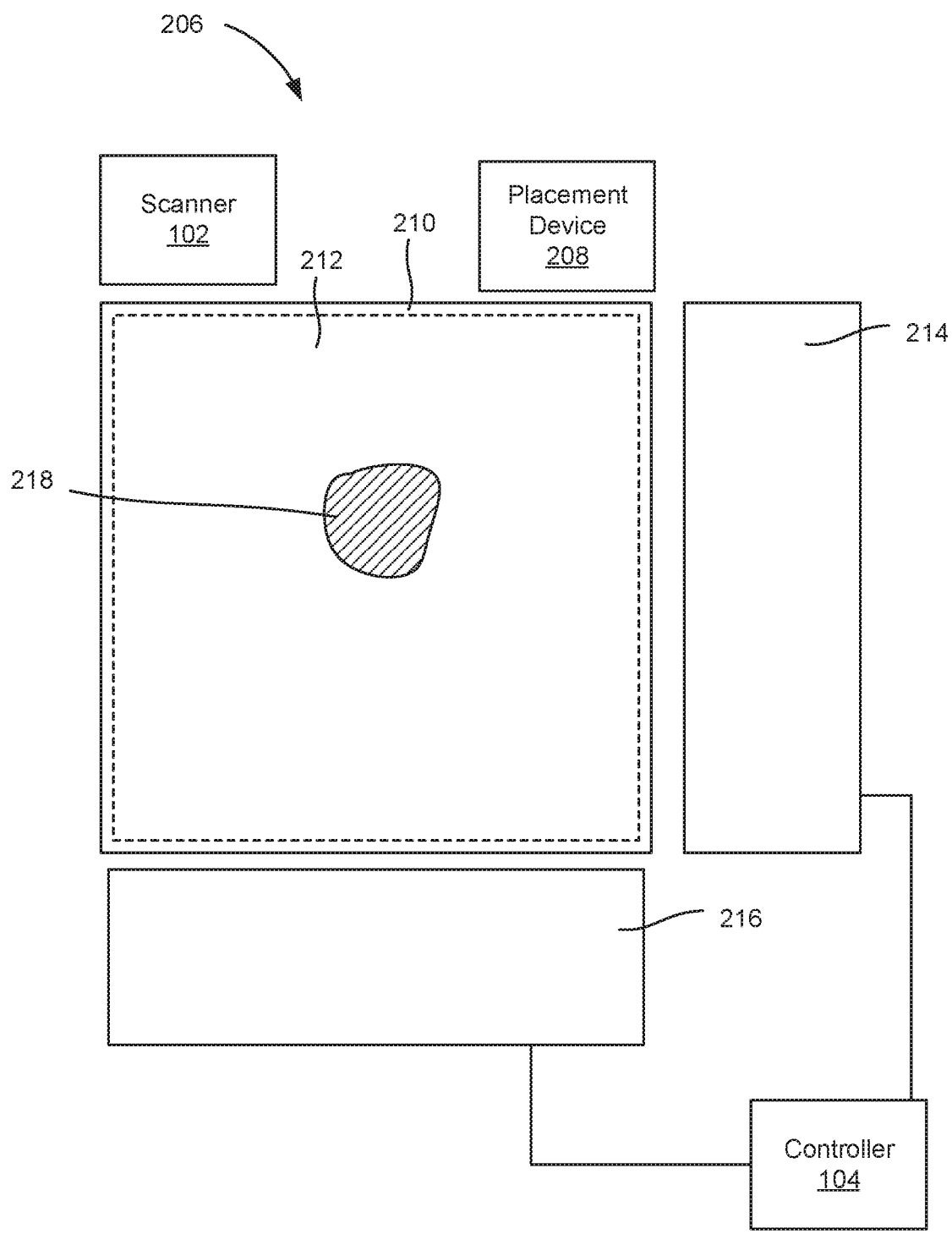
FIG. 2 is a simplified top view of an additive manufacturing system for forming a 3D printed object, according to an example of the principles described herein.

FIG. 2 is a simplified top view of an additive manufacturing system (206) for forming a 3D printed object (218), according to an example of the principles described herein. In general, apparatuses for generating three-dimensional objects may be referred to as additive manufacturing systems (206). The additive manufacturing system (206) described herein may correspond to three-dimensional printing systems, which may also be referred to as three-dimensional printers. The additive manufacturing system (206) includes an additive manufacturing device. An additive manufacturing device may use a variety of operations. For example, the additive manufacturing device may be a fusing agent-based device, a binding-agent based device, a selective laser sintering device, or a selective laser melting device. While FIG. 2 depicts a specific example of an-agent based device, the additive manufacturing device may be any of the above-mentioned devices or another type of additive manufacturing device.

In an example of an additive manufacturing process, a layer of build material may be formed in a build area (212). As used in the present specification and in the appended claims, the term "build area" refers to an area of space wherein the 3D printed object (218) is formed. The build area (212) may refer to a space bounded by a bed (210). In FIG. 2 and others the 3D printed object (218) is indicated in a hashed fill to distinguish the fused nature of the powder build material as compared to the unfused powder build material that surrounds it.

In the additive manufacturing process, any number of functional agents may be deposited on the layer of build material. One such example is a fusing agent that facilitates the hardening of the powder build material. In this specific example, the fusing agent may be selectively distributed on the layer of build material in a pattern of a layer of a three-dimensional object. An energy source may temporarily apply energy to the layer of build material. The energy can be absorbed selectively into patterned areas formed by the fusing agent, while blank areas that have no fusing agent absorb less applied energy. This leads to selected zones of a layer of build material selectively fusing together. This process is then repeated, for multiple layers, until a complete physical object has been formed. Accordingly, as used herein, a build layer may refer to a layer of build material formed in a build area (212) upon which the functional agent may be distributed and/or energy may be applied.

Additional layers may be formed and the operations described above may be performed for each layer to thereby generate a three-dimensional object (218). Sequentially layering and fusing portions of layers of build material on top of previous layers may facilitate generation of the three-dimensional object (218). The layer-by-layer formation of a three-dimensional object (218) may be referred to as a layer-wise additive manufacturing process.

In another example, a binding agent is selectively deposited on to particular areas of the build material to adhere select areas of the build material together. This is again done in a layer-wise fashion. Once all layers of the 3D printed object (218) have been formed, the "green" part is passed to a sintering furnace where it is heated and where pressure is applied to burn out the binder and to sinter particles together.

In one example, the additive manufacturing system (206) includes a build material distributor (216) to successively deposit layers of the build material in the build area (212). Each layer of the build material that is fused in the bed forms a slice of the 3D printed object (218) such that multiple layers of fused build material form the entire 3D printed object (218). The build material distributor (216) may acquire build material from build material supply receptacles, and deposit such acquired material as a layer in the bed (210), which layer may be deposited on top of other layers of build material already processed that reside in the bed (210).

In some examples, the build material distributor (216) may be coupled to a scanning carriage. In operation, the build material distributor (216) places build material in the build area (212) as the scanning carriage moves over the build area (212) along the scanning axis. While FIG. 2 depicts the build material distributor (216) as being orthogonal to the agent distributor (214), in some examples the build material distributor (216) may be in line with the agent distributor (214).

The additive manufacturing system (206) includes an agent distributor (214) to form the 3D printed object (218) by depositing at least one agent onto a layer of powdered build material. In some examples, a different agent is also applied to form a transmitting antenna disposed in the 3D printed object (218). That is, the 3D printed object (218) as described above may include an embedded storage element, and in some examples, a transmitting antenna such that the storage element may be read, or written to.

In some examples, an agent distributor (214) includes at least one liquid ejection device to distribute a functional agent onto the layers of build material. A liquid ejection device may include at least one printhead (e.g., a thermal ejection based printhead, a piezoelectric ejection based printhead, etc.). In some examples, the agent distributor (214) is coupled to a scanning carriage, and the scanning carriage moves along a scanning axis over the build area (212). In one example, printheads that are used in inkjet printing devices may be used as an agent distributor (214). In this example, the functional agent may be a printing liquid. In other examples, an agent distributor (214) may include other types of liquid ejection devices that selectively eject small volumes of liquid.

As described above, the agent distributor (214) may distribute a variety of agents. One specific example of an agent is a fusing agent, which increases the energy absorption of portions of the build material that receive the fusing agent to selectively solidify portions of a layer of powdered build material.

The agent distributor (214) may deposit other agents as well. For example, the agent distributor (214) may distribute a detailing agent that sharpens the resolution of the 3D printed object (218) and provides cooling to selected regions of the powdered build material. The agent distributor (214) may deposit other functional agents to provide functionality to the 3D printed object (218) (e.g., electrical conductivity). For example, the agent distributor (218), may deposit a conductive agent to electrically connect components within the 3D printed object. For example, it may be the case that the components placed in a 3D printed object (218) include a transmitting antenna and an RFID chip. Such a conductive agent may form electrical traces that electrically couple these components. The conductive agent may be formed, at least in part, of metallic nanoparticles dispersed within a solvent. As another example, the agent distributor (204) may deposit a binding agent onto the powder build material to glue particles together to form a "green" object which is later sintered.

As yet another example, the agent distributor (214) may deposit other materials than fusing agent for selectively solidifying portions of the layer. For example, the agent distributor (214) may deposit a plasticizer for reducing material viscosity. That is, the agent distributor (214) can deposit any variety of agents. Each of these agents can be activated under certain conditions such as exposure to heat or energy.

While specific reference is made to agent-based systems, the additive manufacturing system (206) as described herein may be implemented in non-agent-based systems such as selective laser sintering and selective laser melting additive manufacturing processes.

The additive manufacturing system (206) also includes a scanner (102) to read 3D print information from a storage element to be embedded in a 3D printed object (218). In some examples, the scanner (102) may read the information from a storage element in a partially-printed 3D printed object (218) or other partially formed object. That is, an object may be partially manufactured and the storage element may be placed on the partially manufactured object. This partially manufactured object is then placed in the build area (212) to have 3D printing resumed, or initiated, on top of the partially-formed object. In this example, upon insertion into the bed (210), the scanner (102) may read the identifier. Print information is extracted based on the identifier and the controller (104) controls the build material distributor (216) and the agent distributor (214) to subsequently form layers of fused build material on the partially-formed object, thus embedding the storage element inside the 3D printed object (218).

In one particular example of this case, the additive manufacturing system (206) may be in a middle of an assembly line with some amount of assembly having occurred before the RFID chip/partially-formed object reaches the additive manufacturing system (206). That is in this example, the additive manufacturing process may be done on an object that already includes an RFID chip and the additional additive manufacturing operations are carried out based on the scanner (102) reading information on the RFID chip on the partially-formed object. In yet another example, a completed object, such as a completed printed circuit board may be placed in the bed (210) with an additive manufacturing process performed on top of the completed object.

As described above, the scanner (102) in some examples extracts the print information, which may include print parameters, for the 3D printed object (218) from the storage element itself. That is, the storage element may include the identifier for the 3D printed object (218) as well as the print parameters by which it is to be formed. In another example, the scanner (102) may extract some print information, i.e., an identifier for the 3D printed object (218), from the storage element, which identifier may reference a remote location such as a database where additional print information, i.e., the print parameters and in some examples other non-parameter print information is stored. An example of such a system is depicted below in connection with FIG. 3.

The additive manufacturing system (206) also includes a controller (104) to control operation of the additive manufacturing process. The controller (104) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (104) cause the controller (104) to implement at least the functionality of interrupting printing and resuming printing as described below.

Specifically, the controller (104) instructs the additive manufacturing device, i.e., the build material distributor (216) and the agent distributor (214), to form the 3D printed object (218) based on the 3D print information read from the storage element or from the location identified by the identifier on the storage element.

In some examples, the additive manufacturing system (206) includes a placement device (208) to place the storage element in the 3D printed object (218). That is, the storage element may be formed within the 3D printed object (218) such that it accompanies the 3D printed object (218) along its path. The placement device (208) may place the storage element to facilitate this. In some examples, the placement device (208) embeds the storage element during printing of the 3D printed object (218). That is, printing may be paused, for example by the controller (104). During this pause, the placement device (208) collects the storage element, for example via a suction nozzle, moves over the 3D printed object (218) at which time the suction is removed and the storage element is placed inside the body of the 3D printed object (218). Printing is then resumed on top of the storage element such that it is entirely embedded in the 3D printed object. In one particular example, the storage element is snapped into a pocket in the layer of the 3D printed object (208) that is created to receive the storage element.

In another example, the placement device (208) places the storage element following printing of the 3D printed object (218). In this example, the storage element may be placed on a surface of the 3D printed object (218), for example after a post processing operation has been completed.

In either example, the print information, including particular print parameters, and subsequently added data, is directly on the storage element that is inside, or on, the 3D printed object (218). Doing so is effective in that it ensures that any desired information accompanies and is inseparable from the 3D printed object (218), rather than being included as an additional component, such as a user's manual or production manual. Such additional documentation may become lost or destroyed and thus the information contained therein may be permanently lost. By including the information directly on the 3D printed object (218) the potential for such a loss of information is reduced.

As described above, in some examples, the print information is remote from the 3D printed object (218), but an identifier is embedded in the 3D printed object (218). This also delivers the reliability of having information associated with the 3D printed object (218) rather than relying on separate and separable documentation that may become lost or destroyed.

Figure 3:
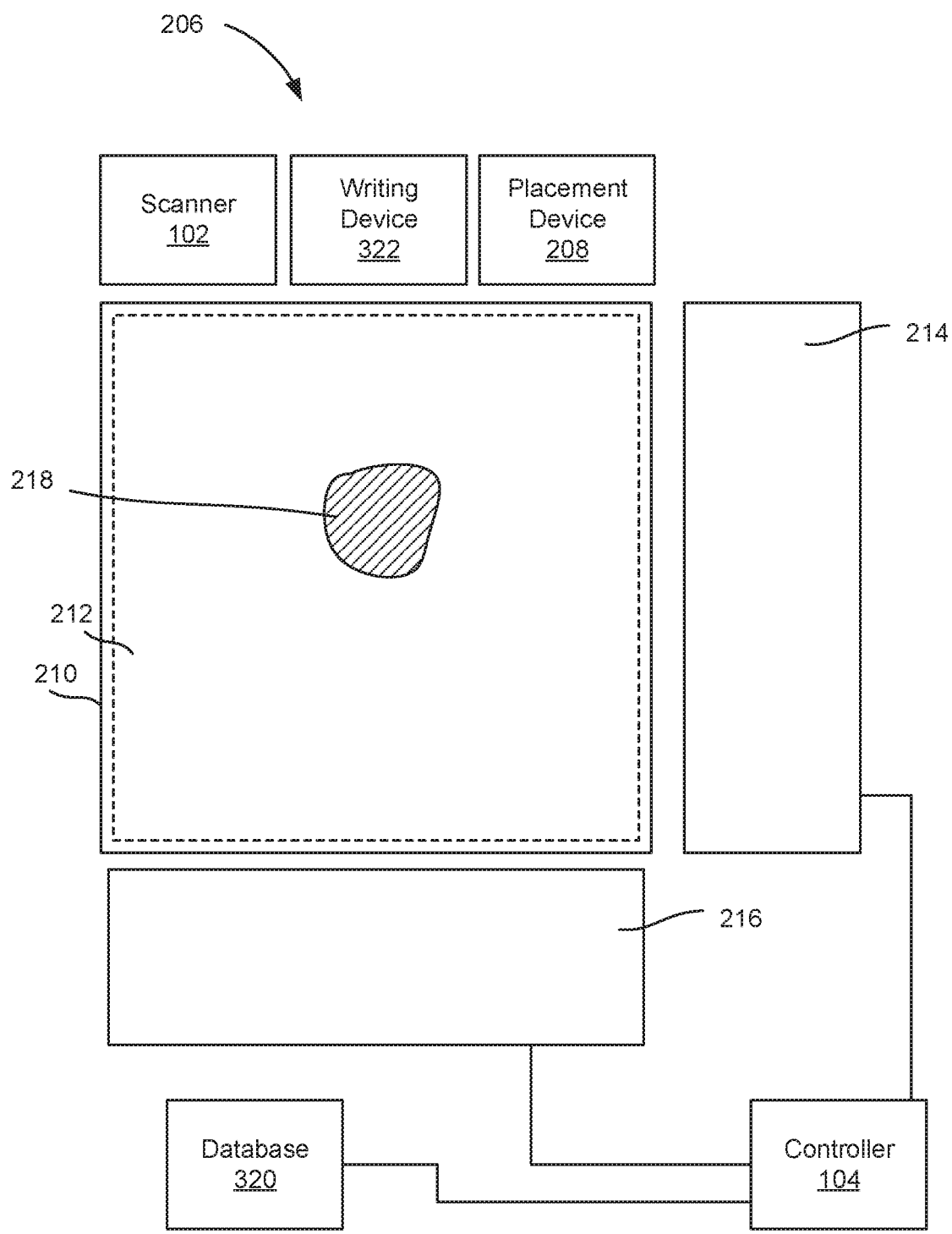
FIG. 3 is a simplified top view of an additive manufacturing system for forming a 3D printed object, according to another example of the principles described herein.

FIG. 3 is a simplified top view of an additive manufacturing system (206) for forming a 3D printed object (218), according to another example of the principles described herein. As with the example depicted in FIG. 2, the additive manufacturing system (206) depicted in FIG. 3 includes a bed (210), scanner (102), placement device (208), agent distributor (214), build material distributor (216), and controller (104) all for forming a 3D printed object (218) with a storage element embedded therein, the storage element to store at least an identifier, and in some examples additional print information.

In this example, the system (206) includes additional components. Specifically, the additive manufacturing system (206) includes a database (320) to store additional print information. That is, a subset of the print information, i.e., the identifier may be stored on the storage element. Other print information which may include print parameters and non-parameter print information may be stored on the database (320). The print information stored in the database (320) may be mapped to the identifier that is stored on the storage element. For example, the storage element may include a pointer, such as a uniform resource locator (URL), that identifies a location where the print information is stored on the database (320). The use of a database (320) may allow for larger amounts of data to be stored thereon. For example, a storage element embedded in a 3D printed object (218) may be able to store large amounts of data, but it may be the case that an amount of data larger than can be stored on the embedded storage device is desired to be associated with the 3D printed object (218). Accordingly, in this example, the database (320) may provide a location where such large amounts of data can be stored.

Still further, the database (320) allows for remote update to the information associated with the identifier and 3D printed object (218). For example, it may be the case that print parameters change over time. With the information stored on the database (320), print operations may be changed in real-time without having to access the storage element on the 3D printed object (218). For example, it may be learned that a different print material or different print temperature results in a stronger 3D printed object (218). Accordingly, this update may be pushed to the database (320) such that when an identifier is scanned by the scanner (102) the updated procedures are followed. In this example, the scanner (102) reads an identifier for the 3D printed object (218) from the storage element and the controller (104) extracts, based on the identifier, the additional print information, including the print parameters for the 3D printed object (218), from the database (320).

In some examples, the additive manufacturing device (206) includes a writing device (322) to add information to the storage element. That is, as described above, over the life of the 3D printed object (218), and in particular during the printing of the 3D printed object (218), additional information may be collected, which may be desired to be shared to intermediaries along the manufacturing/distribution chain and/or the final user of the 3D printed object (218). Accordingly, the writing device (322) may effectuate the addition of this information either to the storage element or to the database (320) that is associated with the storage element.

As a specific example, the embedded elements may include an antenna, a non-volatile memory, and a processor. In this example instructions are transmitted, for example via radio frequency, and the instructions tell the processor to record (write) a transmitted piece of data into the non-volatile memory, making it available for subsequent retrieval. In this example, the antenna can capture (harvest) sufficient energy from the impinging RF energy that it can power the processor and memory, thereby enabling performance of the requested write operation.

The type of information written may be of a variety of types. For example, the print information may be added during printing of the 3D printed object (218). Such information may include the manufacturing conditions (e.g., unique manufacturing conditions) that are experienced during printing. In another example, the information may include post-processing information related to the 3D printed object (218). For example, the written information may include testing procedures that were performed as well as the results of the testing procedures. In other examples, the additional information may include quality assurance tests and results. Thus, the writing device (322) provides for a dynamic state of the information that is associated with the 3D printed object (218). Rather than being static and written one time, the information may be updated, appended to, or otherwise manipulated to provide valuable information to any individual that comes in to contact with the 3D printed object (218) at any point during its lifecycle.

Figure 4:
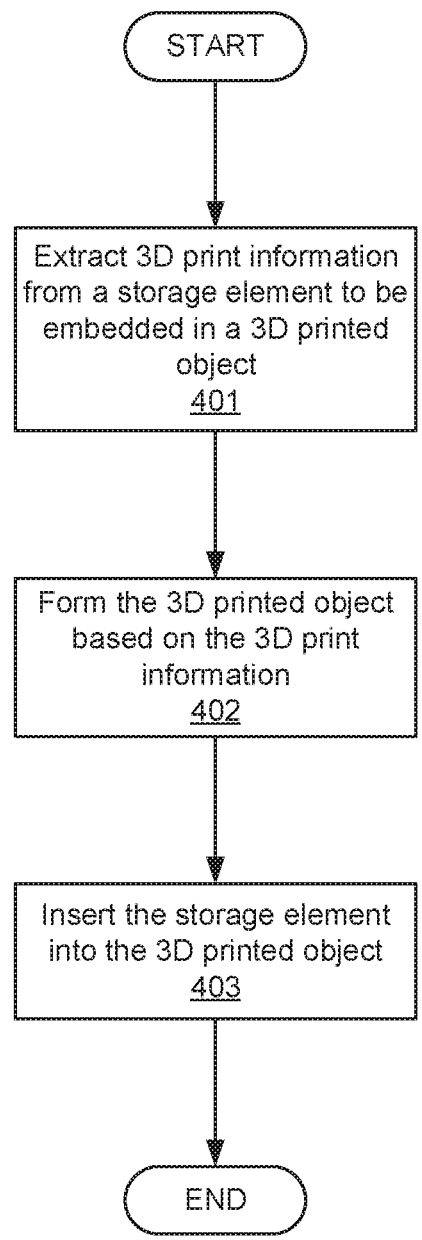
FIG. 4 is a flow chart of a method for reading print information from an embedded storage element, according to an example of the principles described herein.

FIG. 4 is a flow chart of a method (400) for reading print instructions from an embedded storage element, according to an example of the principles described herein. According to the method (400), 3D print information is extracted (block 401) from a storage element that is to be embedded in a 3D printed object (FIG. 2, 218). That is, to form a 3D printed object (FIG. 2, 218) there are various manufacturing parameters and protocols to be adhered to. For example, a particular print material may be selected or particular environmental conditions may be maintained such that a 3D printed object (FIG. 2, 218) with particular properties results. This type of information may be included on a storage element itself, or a pointer to this information may be included on the storage element. Other information may also be stored thereon including post-processing operations to execute and design files for the 3D printed object (FIG. 2, 218). Accordingly, print information and other forms of information may be extracted (block 401) based on the identifier stored in a storage element.

As described above, in some examples this information may be print information. In some examples, the storage element includes non-print information related to the 3D printed object (FIG. 2, 218). For example, the storage element may include, or may point to, user instructions, use instructions, and/or shipping instructions. Thus, the information associated with the identifier includes any piece of information which may be relied on during any stage of the life of the 3D printed object (FIG. 2, 218). That is, information related to a full expected lifecycle of the 3D printed object (FIG. 2, 218) may be associated with the identifier by either storing the information itself on the storage element or uploading it to a database (FIG. 3, 320) where it can be dereferenced by the identifier. Accordingly, in this example, all the post-processing information, testing information, assembly information, and shipping information, among others which is anticipated for the 3D printed object (FIG. 2, 218) may be uploaded to the storage element or the database (FIG. 3, 320) in some examples prior to the 3D printed object (FIG. 2, 218) even being made. As a specific example, information may be included to track the recycling of materials and/or the 3D printed object (FIG. 2, 218) itself. That is, the materials that form the 3D printed object (FIG. 2, 218) may be specialized and thereby may have special recycling instructions. These specialized recycling instructions may be maintained on the storage element. Such recycling information may relate to the recycling of the build material or of the 3D printed object (FIG. 2, 218) itself.

The extracted information may be encrypted to protect against unwanted access and/or manipulation. Such an encryption could be used to verify the accuracy and integrity of returned data to ensure it has not been altered or tampered with.

The 3D printed object (FIG. 2, 218) may then be formed (block 402) based on the 3D print information stored in the storage element. That is, the controller (FIG. 1, 104) may control the additive manufacturing device in whatever form, to form the 3D printed object (FIG. 2, 218) in accordance with the print parameters extracted from the storage element.

In some examples, the 3D print information is extracted from a storage element that is disposed in a partially-formed object. In this example, forming (block 402) the 3D printed object (FIG. 2, 218) comprises forming the 3D printed object (FIG. 2, 218) on top of the partially-formed object. As a specific example, it may be the case that an object to be formed is subject to various manufacturing operations, some of which may be non-additive manufacturing operations. For example, a portion of a part may be formed by a computer numerical control (CNC) device and may have a storage element disposed in this part. In this example, the part may be placed in a bed (FIG. 2, 210) of an additive manufacturing system (FIG. 2, 206). The scanner (FIG. 1, 102) scans the storage element and extracts print instructions for printing on top of the CNC portion of the part. Accordingly, in this example, the additive manufacturing system (FIG. 2, 206) may be in a middle of an assembly line with some amount of assembly having occurred before the 3D printing occurs. In some examples, an entire printed component such as a printed circuit board with a storage element could be placed in the bed (FIG. 2, 210) with additive manufacturing being performed on top of that based on print instructions extracted from the storage element or extracted from a location identified by the storage element.

In some examples, the storage element is inserted (block 403) into the 3D printed object (FIG. 2, 218). That is, as described above, a placement device (FIG. 2, 208) such as a suction nozzle may grab a storage element and move over a location of the 3D printed object (FIG. 2, 218) where it is desired that the storage element be placed. The suction nozzle may move downward, and deactivate suction such that the storage element is placed on a layer of build material in the body of the 3D printed object (FIG. 2, 218).

In the example where the 3D print information is extracted (401) from a partially-formed object and the formation (block 402) of the 3D printed object (FIG. 2, 218) includes printing on top of the partially-formed object, inserting (block 403) the storage element may simply include covering the storage element with additional layers of build material. That is, the insertion may be executed by the action of forming the 3D printed object (FIG. 2, 218) on top of the partially-formed object.

In some examples, inserting (block 403) the storage element into the 3D printed object (FIG. 2, 218) includes inserting an object that contains the storage element into the 3D printed object (FIG. 2, 218). This could be other parts that are printed by 3D printers, or parts formed by non-3D printers. For example, the storage element may be embedded in an object that is not compliant with 3D printing such as wood, bamboo, etc. Such parts themselves may be embedded in a 3D printed object (FIG. 2, 218).

Figure 5:
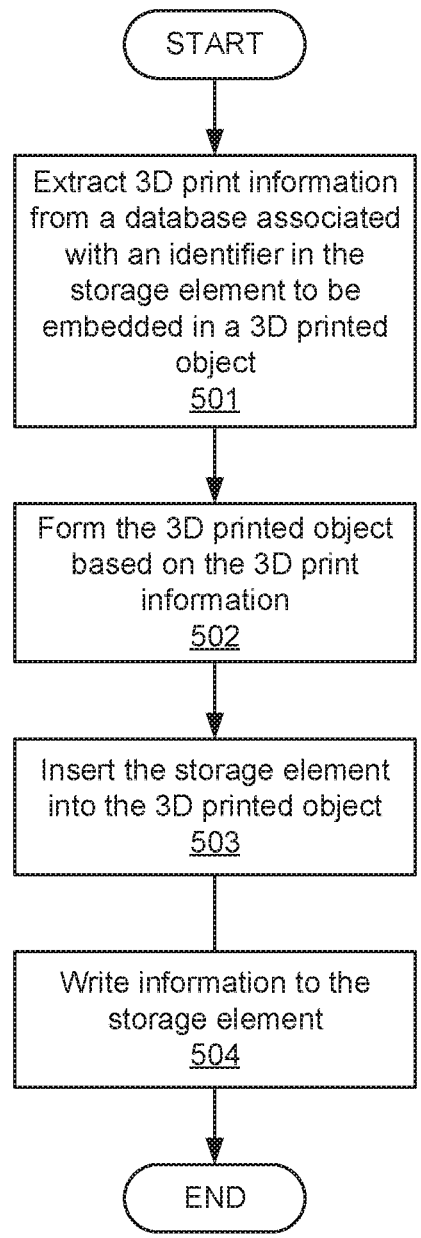
FIG. 5 is a flow chart of a method for reading print information from an embedded storage element, according to another example of the principles described herein.

FIG. 5 is a flow chart of a method (500) for reading print information from an embedded storage element, according to another example of the principles described herein. As described above, in some examples, the 3D print information includes an identifier stored on the storage element and additional print information including print parameters are stored in a database (FIG. 3, 320). In this example, extracting (block 501) 3D print information includes extracting additional print information for the 3D printed object (FIG. 2, 218) from the database (FIG. 3, 320). From this information, the 3D printed object (FIG. 2, 218) is formed (block 502) and a storage element inserted (block 503) into the 3D printed object (FIG. 2, 218).

As described above, when the print information is stored in a database (FIG. 3, 320), that off-board data can be changed before, during, or after manufacture of the 3D printed object (FIG. 2, 218). As a specific example, offboard data in the database (FIG. 3, 320) may change the valid range for a measurement used in the field to verify suitability for operation of a 3D printed object (FIG. 2, 218). In another example, recycling practices may change and the referenced data could be updated accordingly. As yet another example, a new assembly operation could overwrite an earlier version. By storing this information in a database (FIG. 3, 320), all 3D printed objects (FIG. 2, 218) not yet built are instantly updated with the new processes/operations.

In some examples, the method (500) also includes writing (block 504) information to the storage element. That is, over the course of the life of the 3D printed object (FIG. 2, 218) additional information may be added to the storage element and/or database (FIG. 3, 320) to be used in later stages of distribution. In this example, the additional information may be print related, i.e., print conditions experienced during printing, or non-print related, such as post-processing operations, assembly operations, shipping operations, distribution operations, and/or end use.

Tracking Manufacturing Conditions During 3D Printing

During the manufacturing process itself, there is information that can be tied to specific objects using an associated identifier (from the RFID tag or other storage element) and the associated database. This information may include manufacturing conditions (powder build material used, agents used, environmental temperatures, manufacturing duration time, object position in the bed, build bed temperature, etc.), any deviations from ideal manufacturing conditions as determined by in-printer sensor systems, information about the state of the powder used (% recycled, oxidation level if sensor available), post processing information, printer ID, batch number, machine type, printer owner, printer temperature, and room humidity. In one specific example, the information may include information generated based on sensor measurements. For example, the additive manufacturing device may simulate a condition based on an output of a sensor. Such information may be included in the manufacturing conditions. As a specific example, the additive manufacturing device may simulate a temperature experienced by a 3D printed object (FIG. 2, 218) during the print cycle based on an infrared image in the additive manufacturing device (FIG. 2, 218). Additionally, if an RFID chip with an antenna is printed and sensors are also placed in the bed during the additive manufacturing operation and become embedded within the print bed, useful data about the internal print bed temperature could be gathered and read through the powder bed. FIGS. 6-12 describe the acquisition and transmission of such manufacturing conditions and the association of that information with the identifier embedded within the part.

Figure 7:
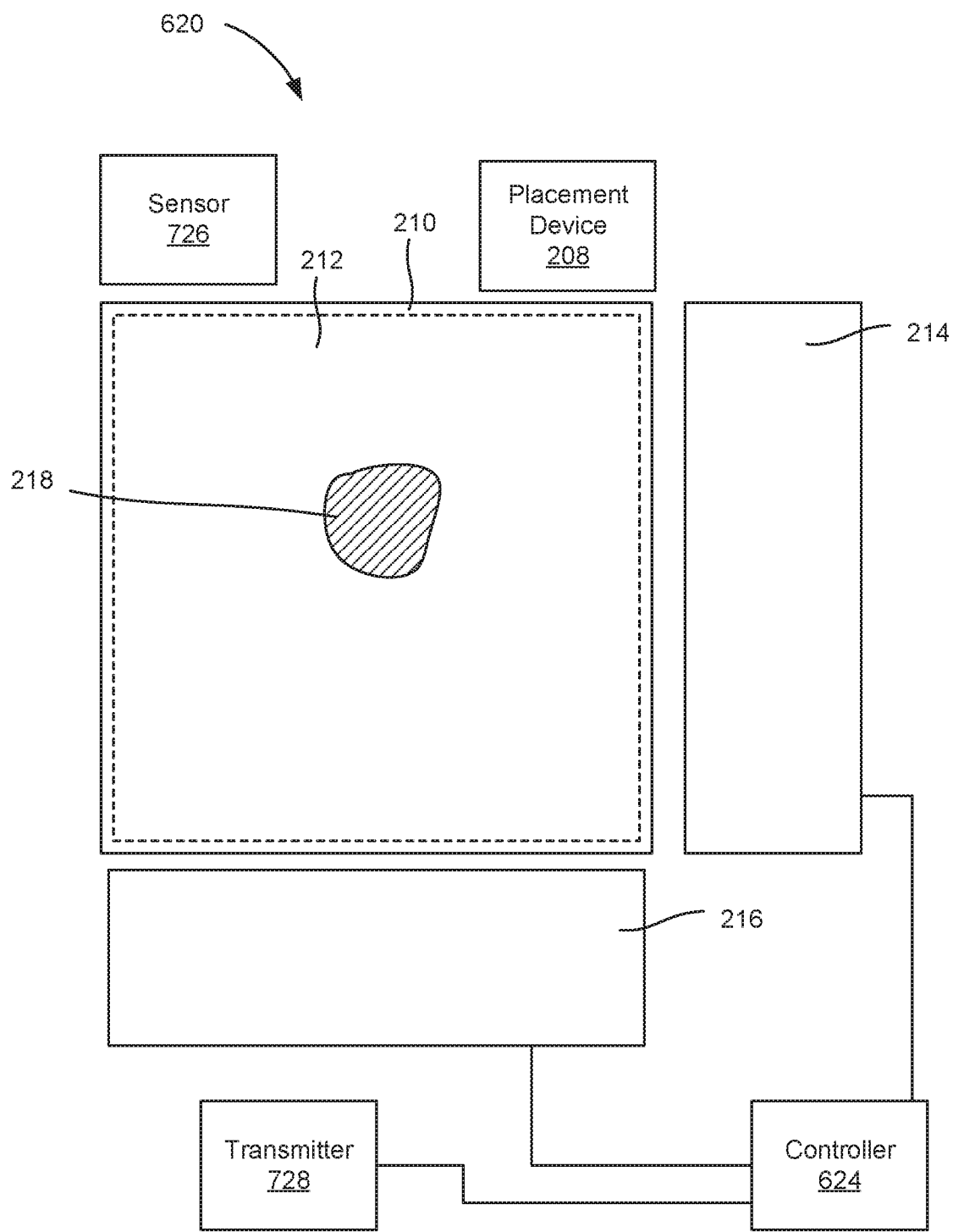
FIG. 7 is a simplified top view of an additive manufacturing system which stores manufacturing conditions while 3D printing, according to an example of the principles described herein.
Figure 8:
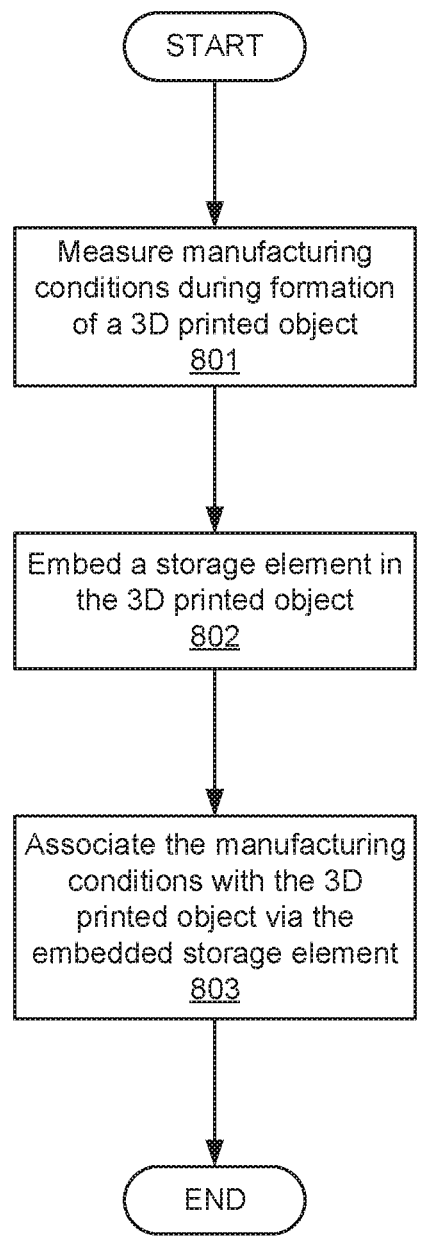
FIG. 8 is a flow chart of a method for storing manufacturing conditions while 3D printing, according to an example of the principles described herein.
Figure 9:
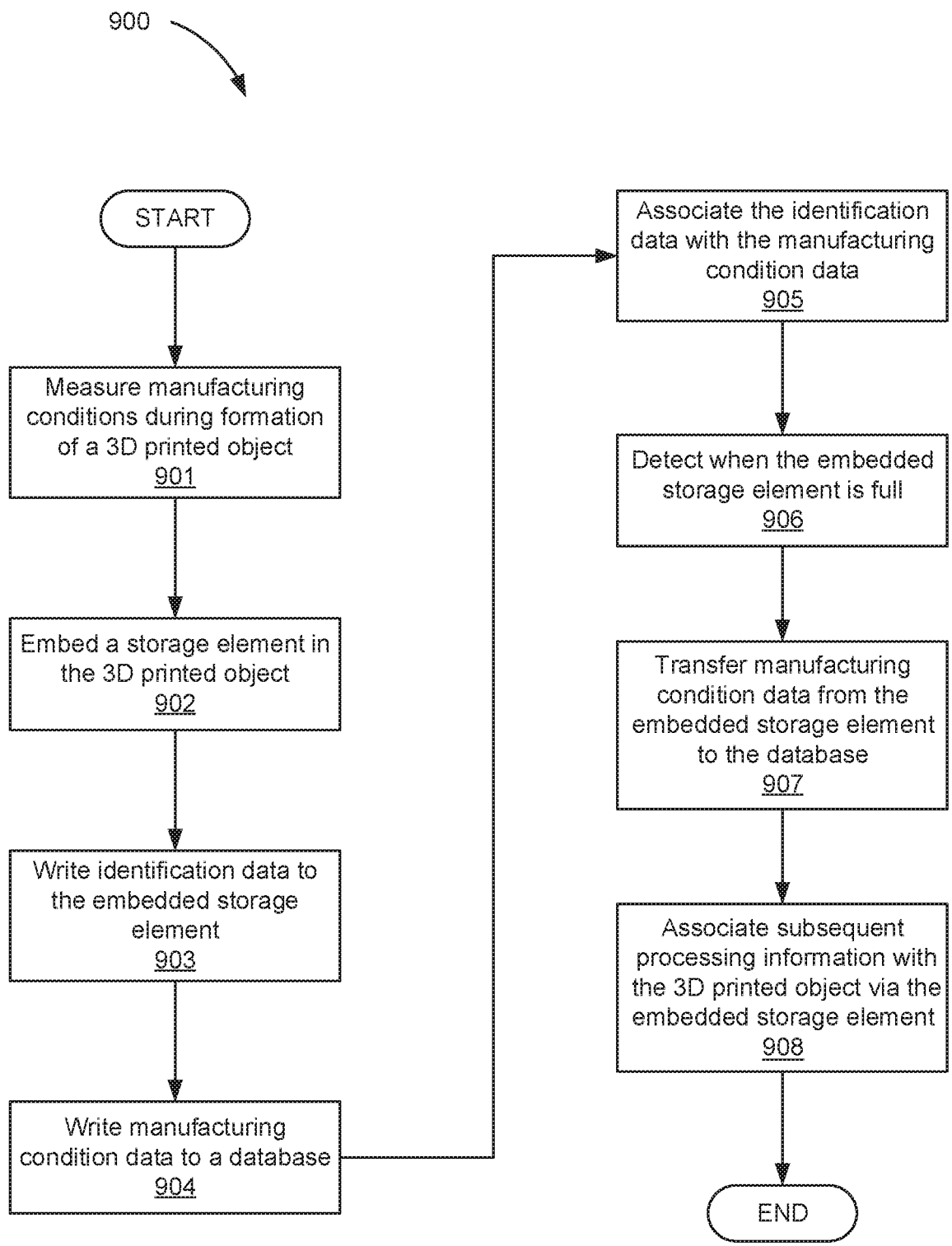
FIG. 9 is a flow chart of a method for storing manufacturing conditions while 3D printing, according to another example of the principles described herein.

Specifically, FIGS. 7-9 describe systems and methods for generating a 3D printed object (FIG. 2, 218) that includes a storage element in it. The additive manufacturing system may store data about manufacturing conditions experienced by the 3D printed object (FIG. 2, 218) on the storage element itself or to a database (FIG. 3, 320) associated with the part and may store an identifier that maps to this data on the 3D printed object (FIG. 2, 218).

Figure 10:
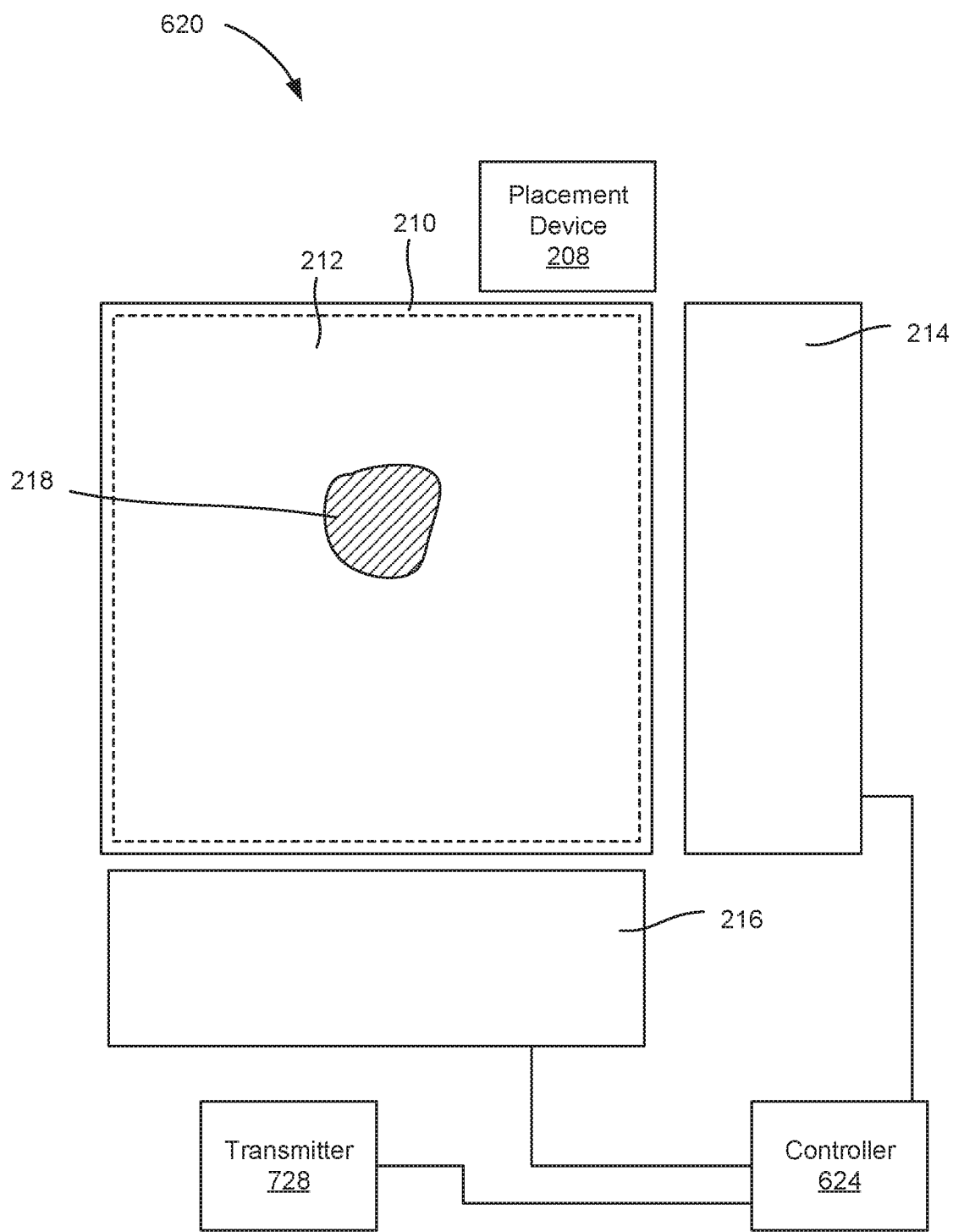
FIG. 10 is a simplified top view of an additive manufacturing system which transmits manufacturing conditions while 3D printing, according to another example of the principles described herein.
Figure 11:
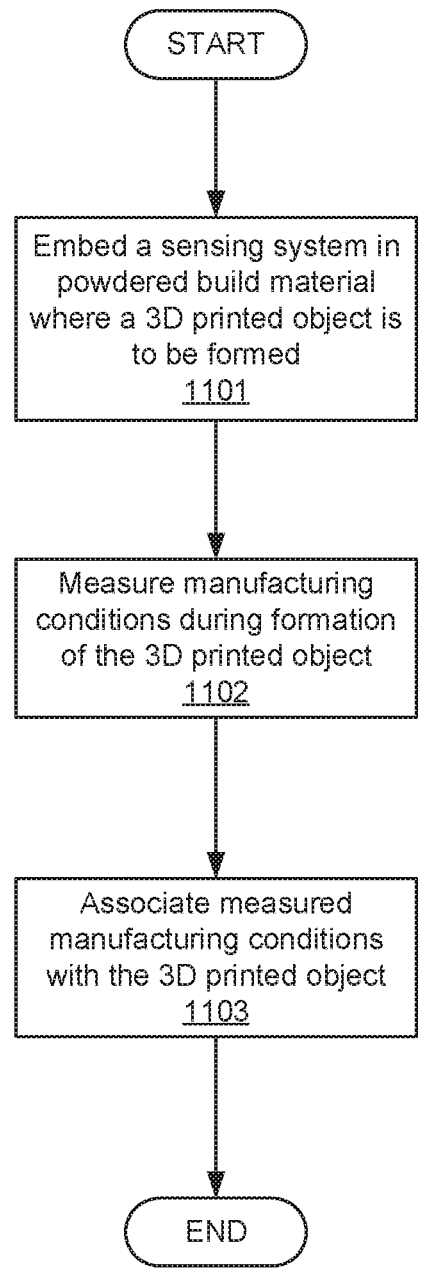
FIG. 11 is a flow chart of a method for transmitting manufacturing conditions while 3D printing, according to an example of the principles described herein.
Figure 12:
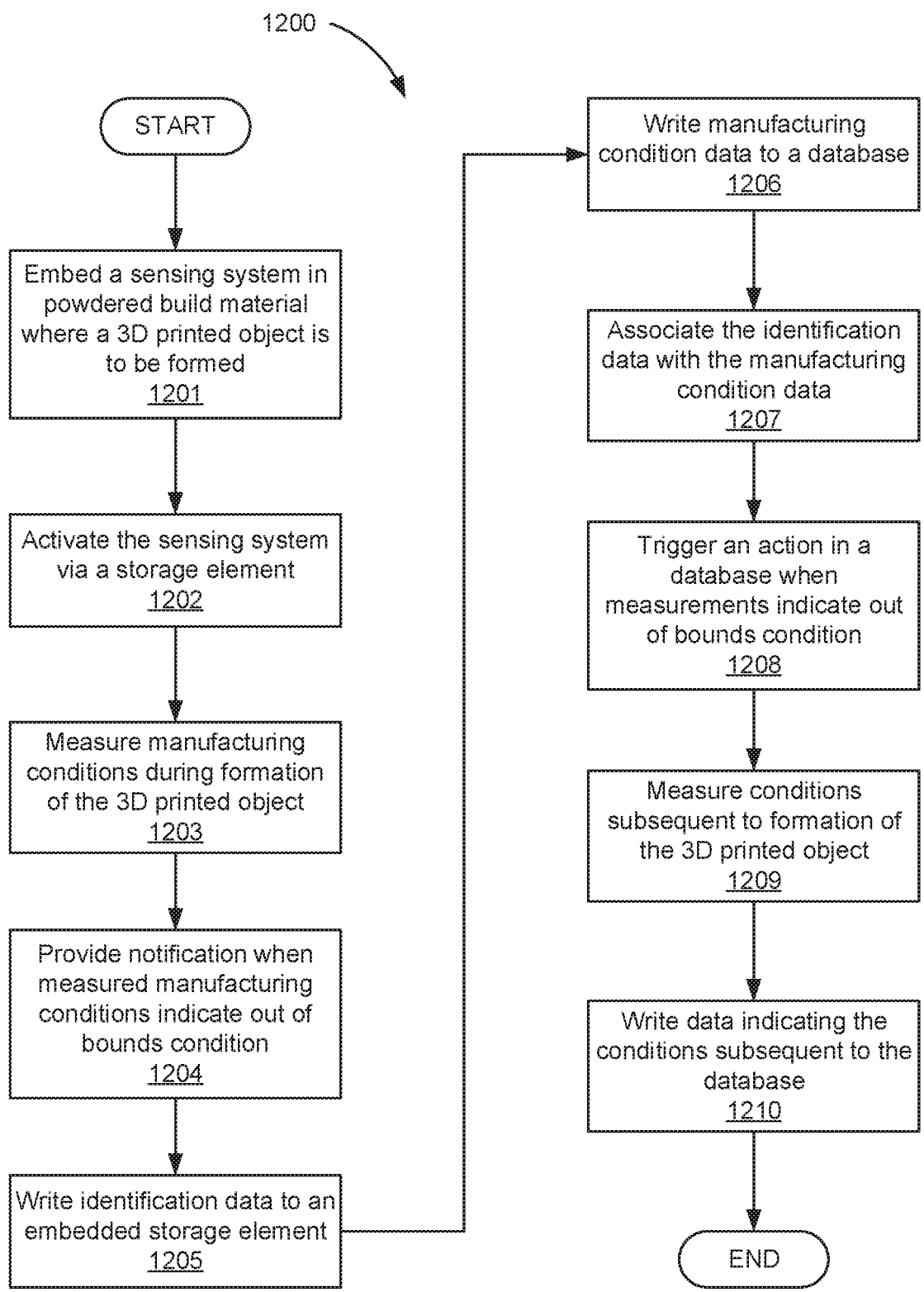
FIG. 12 is a flow chart of a method for transmitting manufacturing conditions while 3D printing, according to another example of the principles described herein.

FIGS. 10-12 describe systems and methods for generating a 3D printed object (FIG. 2, 218) that in some examples do not include a storage element in the 3D printed object (FIG. 2, 218), but that does include a sensor to measure conditions experienced by the 3D printed object (FIG. 2, 218) during manufacturing.

Figure 6:
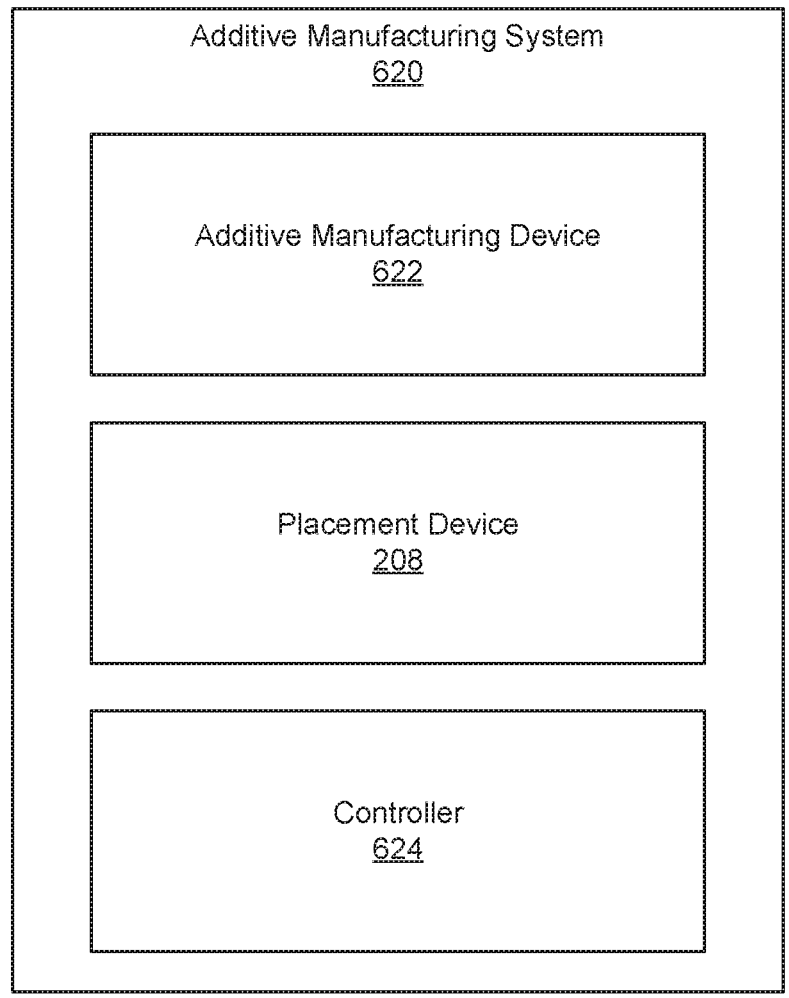
FIG. 6 is a block diagram of an additive manufacturing system for transmitting manufacturing conditions while 3D printing, according to an example of the principles described herein.

Turning now to the figures, FIG. 6 is a block diagram of an additive manufacturing system (620) for transmitting manufacturing conditions while 3D printing, according to an example of the principles described herein. The additive manufacturing system (620) includes an additive manufacturing device (622) to form a three-dimensional (3D) printed object (FIG. 2, 218). As described above, a 3D printed object (FIG. 2, 218) may be formed using any variety of additive manufacturing devices (622) including a fusing-agent based system, a system where a "green" part is passed to a sintering device to sinter particles together. The additive manufacturing device (622) may also be non-agent-based systems such as a selective laser sintering device and a selective laser melting device.

The additive manufacturing system (620) also includes a placement device (208) to embed components into the 3D printed object (FIG. 2, 218). The placement device (208) may take many forms including a suction nozzle to adhere the component to be placed. In different examples, the placement device (208) places different components. For example, in one case, the placement device (208) embeds a storage element into the 3D printed object (FIG. 2, 218). As described above, the storage element may take many forms. In some examples, the embedded storage element may be an RFID tag.

In other examples, the placement device (208) may embed other forms of storage elements, which may be wireless or wired elements. In embedding a wired storage element, a wired connection is made through, for instance, a universal serial bus with embedded flash memory. In this example, the storage element in the 3D printed object (FIG. 2, 218) may be placed and a plug interface is then placed in the 3D printed object. In some examples, the plug interface is also printed using any number of agent or non-agent-based manufacturing methods. In this example, the storage may be written to through the wired connection.

In one example, a full flash storage device may be embedded and no additional connections are made. In this example, if the flash memory module is inserted, connections are made to the flash memory module and printed or placed connectors.

In embedding a wireless storage element, different types of wireless storage elements may have their own module which may include both memory elements and communication elements. For example, with near-field communication, the communication module may include a printed antenna. With UHF wireless communication or other wireless forms of communication, the entire module with the memory and the antenna may be placed in the 3D printed object (FIG. 2, 218). In some examples, there may be a big build area (FIG. 2, 210), potentially with 100 or more parts inside, each with a unique pose (location and orientation) within the build volume. If the storage element in each part has a unique identifier, each part can be written to with unique information related to each part. The storage element that is embedded into the 3D printed object (FIG. 2, 218) is to store measured manufacturing conditions in the additive manufacturing environment.

In another example, components other than a storage element are placed. In one example, the placement device (208) embeds a sensing system into build material used to form the 3D printed object (FIG. 2, 218). In this example, the sensing system measures a manufacturing condition during formation of the 3D printed object (FIG. 2, 218).

The sensing system may take a variety of forms. For example, the sensing system may include a sensor to sense a manufacturing condition, a transmitter to transmit the measured manufacturing condition and a power source to power the sensor. In one example, the transmitter may transmit the manufacturing conditions to a database. That is, rather than storing the measured manufacturing conditions, the measured manufacturing conditions are transmitted to an external database. The transmitted conditions may be used later in product life. For example, particular manufacturing conditions may lead to a 3D printed object (FIG. 2, 218) being more or less susceptible to certain failures. Accordingly, by associating manufacturing conditions with a specific part, additional information, including potential failure, of a 3D printed object (FIG. 2, 218) may be tracked. In another example, the transmitted conditions may be used real-time to adjust manufacturing conditions.

In another example, the transmitter may transmit the manufacturing conditions to the additive manufacturing device (622). That is, in the case of real-time process control for our additive manufacturing, the manufacturing conditions may not be transmitted to a database and instead are transmitted to the additive manufacturing device (622) or to a computing device that might, for example, alter the energy delivered to fuse parts based on current in-bed temperature readings. In some examples, the manufacturing conditions are transmitted both to the additive manufacturing device (622) for real time adjustments and also to the database. In other words, in this particular example, the sensing system does not include a storage element or has a small amount of storage and all sensed information is transmitted directly to the database (FIG. 3, 320) or directly to the additive manufacturing device (622).

The sensor of the sensing system may be of a variety of types. For example, the sensor may be a temperature sensor to monitor a temperature of the 3D printed object (FIG. 2, 218) as it is being formed. The sensor may be a moisture sensor to monitor a humidity of the 3D printed object (FIG. 2, 218) as it is being formed. Other examples of sensors that may be placed into the build material include a strain gauge, a stress gauge, and a displacement sensor.

In some examples, the placement device (208) places the sensing system in a body of the 3D printed object (FIG. 2, 218). That is, the sensing system may be placed in a portion of the build area (FIG. 2, 210) that is enclosed on all sides by fused material. In this example, any measured manufacturing conditions are specific to the 3D printed object (FIG. 2, 218). In another example, the placement device (208) places the sensing system adjacent to, but not in, a body of the 3D printed object (FIG. 2, 218). In this example, any measured conditions extracted may correspond to multiple 3D printed objects (FIG. 2, 218). For example, a temperature output by a temperature sensor may indicate a general temperature within a bed (FIG. 2, 210) and thus may be associated with any of the 3D printed objects (FIG. 2, 218) in the bed at that time. In either case, the information sensed from the sensor may be on a layer-wise fashion. For example, temperature values, humidity values, strain values, etc., per layer may be measured. Such layer-wise measurements may provide even more specificity regarding object manufacturing and can be used downstream to not only provide object-specific information, but to provide a more localized representation of the data.

In another example, the placement device (208) embeds a storage element as well as the sensing system. For example, the sensing system may include a storage element that is to store certain information. The storage element may store the manufacturing conditions themselves or may simply store an identifier that maps to manufacturing conditions as they are stored on the database (FIG. 3, 320). That is, a 3D printed object (FIG. 2, 218) may be made under any variety of manufacturing conditions. An identifier and in some cases the manufacturing conditions themselves, or a portion thereof, may be stored on the storage element while other manufacturing conditions are stored on the database (FIG. 3, 320).

Note that as used in the present specification and in the appended claims, the term manufacturing conditions may include measured conditions during printing and post processing and predetermined conditions. Predetermined conditions may include build material used during printing, agent used during printing, a position of the 3D printed object in the print bed; a state of the build material used during printing (% recycled, oxidation state, etc.), an additive manufacturing device identifier, a batch number, an additive manufacturing device type, an additive manufacturing device owner; digital files for the 3D printed object (FIG. 2, 218), digital file source information, authentication information for the 3D printed object (FIG. 2, 218), and number of prints issued. Note that in this example digital file source information may include such information as where the object file came from, which version of a CAD program was used, what digital rights information is relevant, file resolution/size, date modified, device code, model number, and maintenance records, etc.

Measured conditions may include those measured during printing and after printing. Measured conditions may include a temperature of print materials, a duration of the printing, deviations from predetermined manufacturing conditions, an additive manufacturing device temperature, ambient manufacturing conditions, and nozzle health information. As a specific example, the measured manufacturing conditions may include conditions that occur outside of the actual printing process. For example, a diameter of a hole may be measured after machining it out. This diameter may be recorded on the storage element or database. As yet another example, simulations of measured conditions may also be included. That is, from the measured information, simulations may be made that extend, extrapolate, or otherwise are based on measured information. This information may also be included on the storage element or database.

As will be described below, any number of these manufacturing conditions may be of further value later in the 3D printed object (FIG. 2, 218) lifecycle. By storing this information on the 3D printed object (FIG. 2, 218) itself or associating them to a 3D printed object (FIG. 2, 218) via a database (FIG. 3, 320) valuable information may be available to manage the 3D printed object (FIG. 2, 218). For example, it may be the case that certain manufacturing conditions have been correlated with a particular mode of failure after a particular period of time of use. Accordingly, when a 3D printed object (FIG. 2, 218) is formed under those certain manufacturing conditions, it may be predicted that the 3D printed object (FIG. 2, 218) is likely to fail in accordance with the historical information collected. Accordingly, in some examples, the storage element may store just the measured conditions or the measured conditions along with the predetermined conditions.

In some examples the storage element and the power source are a single component. For example, an embedded RFID tag may store an identifier, and other manufacturing conditions. This same RFID tag may provide power to the sensor of the sensing system. As a specific example, an alternating current (AC) voltage is obtained when resonating with the RFID tag antenna. This voltage can be used to turn on the RFID tag, reading out its ID and rewriting it if instructed by the reader. This voltage can also be used to power the sensing system that is attached to the storage element. That is, at least some portion of the power to operate the sensing system and provoke transmission of measured conditions is supplied externally. That externally supplied power is delivered in the form or RF energy that is captured by an antenna. Specifically, energy from an externally supplied RF signal is resonantly coupled with the embedded antenna. This causes a voltage potential to develop across two parts of the antenna structure. This voltage is then tapped and used to power elements in the circuit, such as the sensor.

The additive manufacturing system (620) may include a controller (624). In different examples the controller (624) performs different operations. For example, when the 3D printed object (FIG. 2, 218) includes a storage element, the controller (624) may write data to the embedded storage element that relates to unique manufacturing conditions of the 3D printed object (FIG. 2, 218). By comparison, when the 3D printed object (FIG. 3, 320) does not include a storage element, the controller (624) may simply associate the manufacturing condition with the 3D printed object (FIG. 2, 218), which may include transmitting measured manufacturing conditions to a database (FIG. 3, 320) or back to the additive manufacturing device (622) for real-time closed loop control of the manufacturing process, and associating the measured manufacturing conditions with a unique identifier for the part.

Returning to the case where the controller (624) writes information to a storage element, the information written may be collected from any number of sensors including sensors disposed within the 3D printed object (FIG. 2, 218) or sensors placed in the bed or elsewhere in the printer (FIG. 2, 210) and that measure certain characteristics such as temperature, humidity, strain, etc.

The information that is written to the embedded storage element may be of a variety of types. For example, the controller (624) may write identification data to the embedded storage element, which identification data may simply include an identifier for the 3D printed object (FIG. 2, 218). In this example, manufacturing conditions, including predetermined manufacturing conditions and/or measured manufacturing conditions are written to a database (FIG. 3, 320). In this example, the controller (624) associates the identification data in the embedded storage element with the manufacturing condition data in the database. Such an association may include a mapping between the two, or writing a pointer, such as a uniform resource locator to the storage element which uniquely directs a computing device to the location on the database (FIG. 3, 320) where the manufacturing conditions are stored.

In this example, the manufacturing information data that is written to the database (FIG. 3, 320) may be added to the data already included in the database (FIG. 3, 320) related to that part. That is, the measured manufacturing condition data may be appended to a file in the database (FIG. 3, 320) that includes the predetermined conditions described above.

In another example, the controller (624) writes the data, both the identification data and the manufacturing data, to the embedded storage element itself. That is, the embedded storage element may have sufficient capacity to store the identifier and at least a portion, if not all, of the manufacturing conditions and subsequent data to be associated with the 3D printed object. In either case, the data may be written to the associated component (storage element or database (FIG. 3, 320)) as the 3D printed object (FIG. 2, 218) is being printed. That is, such information upload may be real-time thus allowing accurate and quick data transmission and access.

In summary, FIG. 6 depicts an additive manufacturing system (620) that either embeds a storage element in the 3D printed object (FIG. 2, 218) or embeds a sensing system in the 3D printed object (FIG. 2, 218). In either case, measured manufacturing conditions are recorded such that they may be tracked for subsequent use or real-time control of the additive manufacturing process.

FIG. 7 is a simplified top view of an additive manufacturing system (620) which stores manufacturing conditions while 3D printing, according to an example of the principles described herein. In the example depicted in FIG. 7, a storage element is embedded in the 3D printed object (218). In this example, the additive manufacturing system (620) includes a build material distributor (216) to deposit layers of powdered build material onto a bed (210) in a build area (212) and an agent distributor (214) to form a 3D printed object (218) by depositing at least one agent onto a layer of powdered build material.

In this example, the additive manufacturing system (620) includes the placement device (208) to embed a storage element into the 3D printed object (218), a controller (624) to associate measured manufacturing conditions with the 3D printed object (218) via the storage element, and a transmitter (728) to store the measured manufacturing conditions to a database (FIG. 320) or to transmit the measured manufacturing conditions to the controller (624) for real-time additive manufacturing control. Note that as described above, the storage element stores an identifier and may store some of the manufacturing conditions.

In one particular example, the 3D printed object (218) itself does not include a sensor, but rather the sensor (726) is disposed on the additive manufacturing system (620). Accordingly, in this example, the controller (624) may write the output of the sensor (726) to either the storage element or the database (FIG. 3, 320). That is, the sensor (726) may record manufacturing conditions during formation of the 3D printed object (218) and the transmitter (728) transmits the measured conditions. As described above, the measured manufacturing conditions may be associated with the 3D printed object (218) on a per-layer level and may be encrypted. That is, the controller (624) may apply a number of encryption operations to ensure the recorded manufacturing conditions are not manipulated or otherwise undesirably accessed. As described above, recording the measured conditions may link potential, or actual failures of the 3D printed object (218) with the manufacturing conditions, which may lead to alteration of those conditions to enhance 3D printed object (218) performance.

FIG. 8 is a flow chart of a method (800) for storing manufacturing conditions while 3D printing, according to an example of the principles described herein. According to the method (800), manufacturing conditions are measured (block 801) during formation of a 3D printed object (FIG. 2, 218). The measurements may be made by any variety of sensors. For example, temperature sensors, moisture sensors, strain gauges, etc. may be used to measure the manufacturing conditions when making the 3D printed object (FIG. 2, 218). Such information may be used at any of a variety of stages of the 3D printed object (FIG. 2, 218). For example, the information may be used in failure detection and/or prediction. Moreover, such information may be used to ensure that part properties match an expected usage for the part. In some examples, the measurements (block 801) may be by a sensor disposed within the bed (FIG. 2, 210) or by a sensing system disposed within the 3D printed object (FIG. 2, 218) itself.

Also, during the manufacturing process, a storage element is embedded (block 802) in the 3D printed object (FIG. 2, 218). That is, the placement device (FIG. 2, 208) may operate to collect a storage element, position it in a predetermined location which may be in the body of the 3D printed object (FIG. 2, 218), and physically place the storage element. Additive manufacturing may then be continued on top of the storage element such that the storage element is completely enveloped by build material. The embedding of the storage element inside the 3D printed object (FIG. 2, 218) protects the storage element from mechanical damage and may provide security to the part as a third party would have to destroy the part itself in order to access the storage element.

The manufacturing conditions may be associated (block 803) with the 3D printed object (FIG. 2, 218) via the embedded storage element. Such association (block 803) may take many forms. For example, the measured manufacturing conditions may be written directly to a database (FIG. 3, 320). In this example, the association is made via an identifier written on the storage element which maps to a database (FIG. 3, 320) location where the manufacturing conditions are stored. In another example, measured manufacturing conditions may be passed directly to the additive manufacturing device (FIG. 6, 622) for real-time process control. In yet another example, the measured manufacturing conditions are written directly to the storage element. In either case, the measured object-specific manufacturing conditions are specifically associated with that 3D printed object (FIG. 3, 320) such that the conditions are tracked for subsequent use, later operations, and/or use of the 3D printed object (FIG. 2, 218).

FIG. 9 is a flow chart of a method (900) for storing manufacturing conditions while 3D printing, according to another example of the principles described herein. According to the method (900), manufacturing conditions are measured (block 901) during formation of a 3D printed object (FIG. 2, 218) and a storage element is embedded (block 902) in the 3D printed object (FIG. 2, 218). These operations may be performed as described above in connection with FIG. 8.

As a specific example, a number of post processing devices may perform any number of post processing operations such as cleaning, sand-blasting, finishing, assembly, etc. Accordingly, post processing information such as what operations the 3D printed object (FIG. 2, 218) was subject to may be written to the storage element and that information may similarly be used in subsequent life stages for the 3D printed object. (FIG. 2, 218).

As described above, the manufacturing conditions are associated with the 3D printed object (FIG. 2, 218), which may involve relying on a database (FIG. 3, 320) to make the association. In this example, identification data, such as an identifier, is written (block 903) to the embedded storage element while manufacturing condition data is written (block 904) to the database (FIG. 3, 320). An association (block 905) is then made between the identification data and the manufacturing condition data. With such an association, the manufacturing data may be accessed simply by scanning the identification data on the 3D printed object (FIG. 2, 218). As a specific example, the 3D printed object (FIG. 2, 218) may include an embedded RFID tag that is not visible when the 3D printed object (FIG. 2, 218) is complete. During interrogation of the RFID tag via an RFID scanner, the identifier is retrieved, and a pointer to a location of the database (FIG. 3, 320) is identified. A computing device coupled to the RFID scanner can then access the database (FIG. 3, 320) and have access to the contents, i.e., measured manufacturing conditions and predetermined manufacturing conditions, included therein. The use of a database (FIG. 3, 320) to contain the information provides a large memory where large amounts of storage space is available.

As described above, in some examples, a portion of the manufacturing conditions are stored on the embedded storage element itself. In this example, circumstances may arise when the embedded storage element is full. That is, the embedded storage element has a finite amount of space, and the method (900) may include detecting (block 906) when the embedded storage element is full. When the embedded storage element is full, the manufacturing condition data is transferred (block 907) to the database (FIG. 3, 320).

In addition to manufacturing conditions, other subsequent processing information may also be associated (block 908) with the 3D printed object (FIG. 2, 218). This subsequent processing information may include conditions subsequent to the manufacturing operations. As with the manufacturing conditions, this other processing information may similarly be associated (block 908) with the 3D printed object (FIG. 2, 218) via the embedded storage element. That is, over the course of its life the 3D printed object (FIG. 2, 218) passes through a number of stages, the devices used in each of these stages may have different sensors and/or scanners that can write information to the embedded storage element.

In one example, the subsequent processing information may indicate testing information. That is, the additional information may indicate the results of testing of the 3D printed object (FIG. 2, 218). For example, the test results may indicate a strength of the 3D printed object or a surface finish thereof. As described above, this information may be mapped to the manufacturing conditions. The manufacturing conditions and/or the additional operations may be customized based on the stored information. For example, if manufacturing conditions include an ambient temperature that results in 3D printed objects (FIG. 2, 218) that have a lower print resolution, a more aggressive finishing operation may be executed to ensure a desired print resolution.

In these examples, the information is specific to the 3D printed object (FIG. 2, 218) rather than to a batch of 3D printed objects (FIG. 2, 218). The more specialized and specific the data is, the more accurate remedial or subsequent operations may be. That is, if a particular manufacturing condition is deemed to result in a particular defect, rather than classifying an entire batch or shipment as having that particular defect, the manufacturing conditions may be analyzed for each individual 3D printed object (FIG. 2, 218) to determine specifically which 3D printed objects (FIG. 2, 218) were affected.

In yet another example, the subsequent processing information may include build material recycling information. That is, particular build materials used during the additive manufacturing process may have particular procedures regarding their disposal. Accordingly, the subsequent processing information may indicate these particular recycling procedures to carry out.

FIG. 10 is a simplified top view of an additive manufacturing system (620) which transmits manufacturing conditions while 3D printing, according to another example of the principles described herein. In the example depicted in FIG. 10, a storage element may not be embedded in the 3D printed object (218) and measured manufacturing conditions are transmitted directly to a database (FIG. 3, 320) or to the additive manufacturing device (FIG. 6, 622). That is, in this example, just a sensing system is disposed in the 3D printed object (218) and measures manufacturing conditions. As will be described below, in the case that the sensing system includes a storage element, the sensor could be activated by the storage element. In the case the sensing system does not include a storage element, the additive manufacturing device (620) may periodically read the sensor without a storage element.

In this example, the additive manufacturing system (620) includes a build material distributor (216) to deposit layers of powdered build material onto a bed (210) in a build area (212) and an agent distributor (214) to form a 3D printed object (218), and in some cases a transmitting antenna disposed in the 3D printed object (218), by depositing at least one agent onto a layer of powdered build material. Note that the agent distributed to form the 3D printed object (218)

may be different than the build material to form the transmitting antenna. For example, the agent distributor (214) may distribute a fusing agent to form the 3D printed object (218) and may deposit a conductive agent to form the transmitting antenna.

In this example, the additive manufacturing system (620) includes the placement device (208) to embed a sensing system into the 3D printed object (218), a controller (624) to receive, from the sensing system, manufacturing condition data during the formation of the 3D printed object (218). In this example as there may be no storage element, the additive manufacturing system (620) includes a transmitter (728) to store the recorded manufacturing conditions to a database (FIG. 320) or to transmit the recorded manufacturing conditions directly back to the additive manufacturing device (FIG. 6, 622) for use in real time closed-loop feedback for the additive manufacturing process. That is, the sensor (726) may measure manufacturing conditions during formation of the 3D printed object (218) and the transmitter (728) transmits the measured conditions.

As described above, the measured manufacturing conditions may be associated with the 3D printed object (218) on a per-layer level and may be encrypted. That is, the controller (624) may apply a number of encryption operations to ensure the measured manufacturing conditions are not manipulated or otherwise undesirably accessed. In some examples, the controller (624) receives the manufacturing condition data while the 3D printed object (218) is being formed and such data is read through the layers of the build material. That is, the additive manufacturing system (620) of the present specification allows for part identification and data transmission even without line of sight paths between the sensor and the controller (624).

FIG. 11 is a flow chart of a method (1100) for transmitting manufacturing conditions while 3D printing, according to an example of the principles described herein. According to the method (1100), a sensing system is embedded (block 1101) in a build area where a 3D printed object (FIG. 2, 218) is to be formed. That is, the placement device (FIG. 2, 208) may operate to collect components of the sensing system (i.e., sensor, antenna, power source, and in some examples a storage element), position the components in a predetermined location within the build area (FIG. 2, 212), and physically place the sensing system. As described above, in some examples the predetermined position may be within a body of a particular 3D printed object (FIG. 2, 218) thus providing information for a single 3D printed object (FIG. 2, 218). In another example, the predetermined position may be adjacent to a particular 3D printed object (FIG. 2, 218) thus providing information for multiple 3D printed objects (FIG. 2, 218) within the build area (FIG. 2, 212). That is, in this example, the output from a single sensor may be associated with multiple nearby 3D printed objects (FIG. 2, 218).

Manufacturing conditions are measured (block 1102) during formation of a 3D printed object (FIG. 2, 218). The measurements may be made by any variety of sensors. For example, temperature sensors, moisture sensors, strain gauges, etc. may be used to measure the measurement conditions when making the 3D printed object (FIG. 2, 218). Such information may be used at any of a variety of stages of the 3D printed object (FIG. 2, 218). For example, the information may be used in failure detection and/or prediction. Moreover, such information may be used to ensure that part properties match an expected usage for the part.

The manufacturing conditions may be associated (block 1103) with the 3D printed object (FIG. 2, 218). In one example, the measured manufacturing conditions are written directly to a database (FIG. 3, 320). As described above, the measured manufacturing conditions may be specific to a particular 3D printed object (FIG. 2, 218) such that the conditions are tracked for subsequent use, later operations and/or use of the 3D printed object (FIG. 2, 218).

FIG. 12 is a flow chart of a method (1200) for transmitting manufacturing conditions while 3D printing, according to another example of the principles described herein. According to the method (1200) a sensing system is embedded (block 1201) into a 3D printed object (FIG. 2, 218). This operation may be performed as described above in connection with FIG. 11.

In one example, the embedded sensing system is activated (block 1202) via a storage element of the sensing system. That is, as described above, an RFID tag may provide power to the sensor of the sensing system. As a specific example, an alternating current (AC) voltage is obtained when resonating with the RFID tag antenna. This voltage can also be used to power the sensing system that is attached to the storage element. Specifically, energy from an externally supplied RF signal is resonantly coupled with the embedded antenna. This causes a voltage potential to develop across two parts of the antenna structure. This voltage is then tapped and used to power elements in the circuit, such as the sensor. Accordingly, at least some portion of the power to operate the sensing system and provoke transmission of measured conditions is supplied externally. That externally supplied power is delivered in the form or RF energy that is captured by an antenna.

In some examples, such activation of the sensing system may be just during the printing process. That is, after manufacturing, for example during post processing, shipping and/or use, the sensor may be de-activated. In some examples, the printing process may include a 10- or 20-hour period after initial fusion of plastic build powder as this period may be of interest as it can affect final part properties. That is, the heating, melting, and cooling of a 3D printed object (FIG. 2, 218) may have an effect on part performance.

Manufacturing conditions are measured (block 1203) during formation of a 3D printed object (FIG. 2, 218). This operation may be performed as described above in connection with FIG. 11.

In some examples, a notification is provided (block 1204) when measured manufacturing conditions indicate an out of bounds manufacturing condition. An out of bounds manufacturing condition may be met in various ways. In one example, an out of bounds manufacturing condition exists when measured manufacturing conditions exceed threshold levels. In another example, a control system such as the controller (FIG. 6, 624) analyzes a set of conditions and/or analyzes one condition over time and determine if an exception has occurred warranting specific action.

That is, as described above, certain manufacturing conditions may correlate to expected failure or other undesirable performance of the 3D printed object (FIG. 2, 218). Accordingly, such a notification may put a user on notice that there exists a potential of undesirable performance and/or object failure. The notification may be provided in any number of ways via a user interface.

As described above, the manufacturing conditions are associated with the 3D printed object (FIG. 2, 218), which association may rely on a database (FIG. 3, 320). In this example, identification data, such as an identifier is written (block 1205) to the embedded storage element while manufacturing condition data is written (block 1206) to the database (FIG. 3, 320). An association (block 1207) is then made between the identification data and the manufacturing condition data. That is, with such an association the manufacturing data may be accessed simply by scanning the identification data on the 3D printed object (FIG. 2, 218). As a specific example, the 3D printed object may include an embedded RFID tag that is not visible when the part is complete. During interrogation of the RFID tag by an RFID scanner, the identifier is retrieved, and a pointer to a location of the database (FIG. 3, 320) is identified. A computing device coupled to the RFID scanner can then access the database (FIG. 3, 320) and have access to the contents, i.e., measured manufacturing conditions and predetermined manufacturing conditions, included therein.

In addition to providing the notification (block 1204), in some examples, an action may be triggered (block 1208) in the database (FIG. 3, 320) to indicate the out of bounds manufacturing condition. That is, a notification may be provided such that a remedial action is recommended and, in some examples, the data is simply highlighted and a user is to assess the need for remedial action.

In addition to manufacturing conditions, other conditions may also be associated with the 3D printed object (FIG. 2, 218). As with the manufacturing conditions, these other conditions may similarly be associated with the 3D printed object (FIG. 2, 218). That is, over the course of its life the 3D printed object (FIG. 2, 218) passes through a number of stages, devices used in each of these stages may have different sensors and/or scanners that can write information to the embedded storage element. As a specific example, a number of post processing devices may perform any number of post processing operations such as cleaning, sand-blasting, finishing assembly, etc. Accordingly, the same sensing system that measures (block 1203) manufacturing conditions may measure (block 1209) conditions subsequent to formation of the 3D printed object. These additional measurements may also be written (block 1210) to the database (FIG. 3, 320). That is, just as a temperature sensor measures a temperature of a 3D printed object (FIG. 2, 218) during manufacturing, the same temperature sensor may measure a temperature of a 3D printed object (FIG. 2, 218) during transit. Such measurements, similar to those made during additive manufacturing, may be the basis of a notification and or action within the database. Take for example a 3D printed part that is manufactured in an environment that does not exceed a threshold humidity level, but that when the object is along the distribution chain, its humidity exceeds the threshold humidity level. In this example, the moisture value may be written to the database and a particular action, such as highlighting the measurement, or providing an alert, may be executed to notify a user.

Automated Handling Based on Part Identifier and Part Location

Once a 3D printed object (FIG. 2, 218) is manufactured, it is subject to various post processing operations including, but not limited to finishing, cleaning, assembly, testing, and shipping. In some examples, the identifier previously described, along with a determined object location, can be used to facilitate the execution of the post processing and other operations. FIGS. 13-16 depict such a situation. Specifically, FIGS. 13 through 16 relate to systems and methods that read an identifier from a 3D printed object (FIG. 2, 218) that includes an embedded storage element. The system determines how to post process the 3D printed object (FIG. 2, 218) based on the identifier (e.g., how to unpack the part from a print bed, how to post process the part, or how to test the part).

Figure 13:
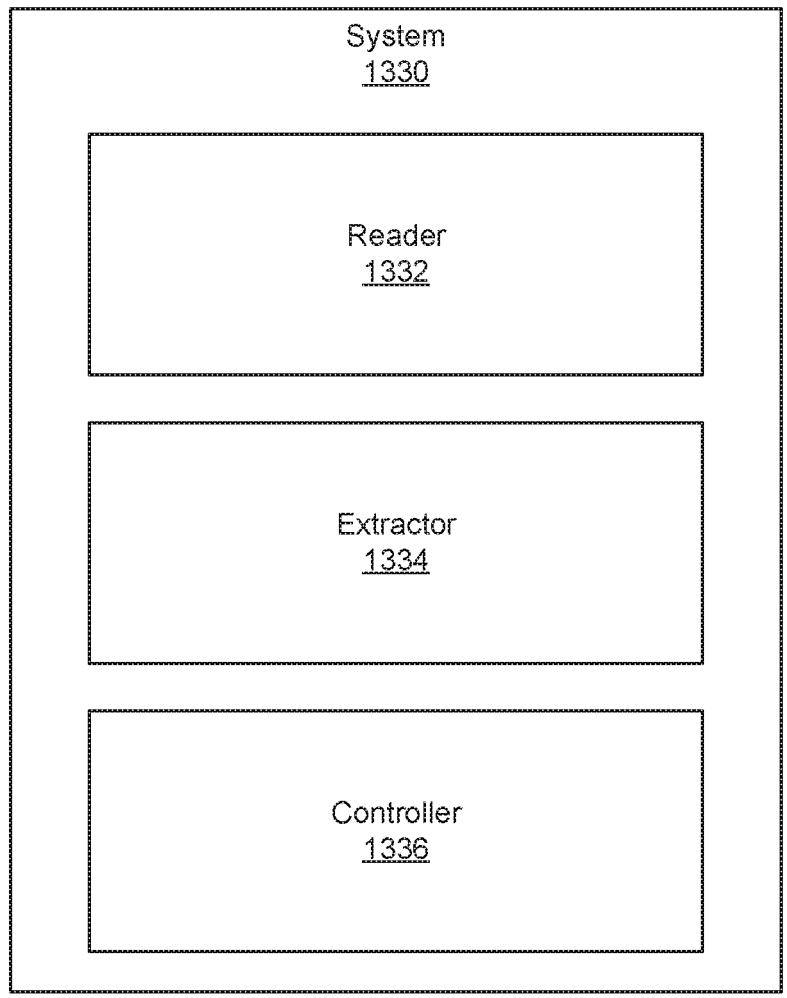
FIG. 13 is a block diagram of a system for automated handling based on part identifier and location, according to an example of the principles described herein.

Turning now to the figures, FIG. 13 is a block diagram of a system (1330) for automated handling based on object identifier and location, according to an example of the principles described herein. That is, as described above, a number of post processing operations may be executed on the 3D printed object (FIG. 2, 218). In other examples, an operator may have to consult a user manual, or other documentation when determining what these post processing operations are. If such documentation becomes lost or damaged, the ability to accurately post process a 3D printed object (FIG. 2, 218) based on specific criteria may be impeded. Moreover, any such documentation may not be object specific. That is, different 3D printed objects (FIG. 2, 218) being subject to different manufacturing conditions, may justify different post processing operations to enhance their quality and/or performance. A generic document may not account for such variations. Moreover, any such documentation is static and implementing changes into a post processing operation may be very time consuming and complex and include a phasing out of old documentation, which may take large amounts of time, writing new procedures, and distributing those procedures to relevant personnel. Again, this process may be prohibitively long. Of course, all this is dependent upon such documentation actually existing. Accordingly, the present system (1330) avoids these situations and allows for always present and dynamic information to be collected by scanning an identifier from the 3D printed object (FIG. 2, 218) itself.

Accordingly, the system (1330) includes a reader (1332) to read various pieces of information. Specifically, the reader (1332) may read an identifier from a 3D printed object (FIG. 2, 218) that includes a storage element. That is, as described above, a storage element, such as an RFID tag may be embedded within the 3D printed object (FIG. 2, 218) itself. In this example, the reader (1332) may include an RFID scanner that can extract the identifier from the storage element embedded within the 3D printed object (FIG. 2, 218).

The reader (1332) may also read other information. For example, the reader (1332) may read a pose of the 3D printed object (FIG. 2, 218) within a build material bed. That is, a 3D printed object (FIG. 2, 218) is formed in a build area. The build area is larger than the 3D printed object (FIG. 2, 218) such that the 3D printed object (FIG. 2, 218) may be disposed at various poses within the build area. The pose of the 3D printed object (FIG. 2, 218) may affect the post processing operations that are carried out. For example, a robotic arm may collect the 3D printed object (FIG. 2, 218) from the build area. With the pose of the 3D printed object (FIG. 2, 218) identified, the robotic arm can safely collect the 3D printed object (FIG. 2, 218) without damaging the part.

Such information may be read from a variety of locations. For example, the location information may be stored on the storage element itself. In other examples, the location information may be stored on a database (FIG. 3, 320). In either example, the location information is read such that effective, accurate, and safe subsequent operations may be executed without damaging the part. In some examples, the location information is written to the storage element and/or database (FIG. 3, 320) during printing. That is the systems described in connection with FIGS. 6-12 could be used to determine the location of the 3D printed object (FIG. 2, 218) within the build area (FIG. 2, 210) and transmit that information to the storage element or database (FIG. 3, 320). This information can then be read to determine how to handle the 3D printed object (FIG. 2, 218).

As used in the present specification and in the appended claims, the term, "reader" refers to various hardware components, which may include a processor and memory. The processor may include the hardware architecture to retrieve executable code from the memory and execute the executable code. The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. As specific examples, the reader as described herein may include computer readable storage medium, computer readable storage medium and a processor, and an application specific integrated circuit (ASIC).

The system (1330) also includes an extractor (1334) to extract a post processing operation to execute on the 3D printed object (FIG. 2, 218). That is, each 3D printed object (FIG. 2, 218) is subject to any number of post processing operations and those operations are associated with an identifier. Accordingly, the extractor (1334) extracts the post processing operation information based on the identifier. As described above, previously an operator would have to manually determine the post-processing operations. However, using the current system (1330) control of such post processing is automated.

Specifically, automated handling of 3D printed objects (FIG. 2, 218) is enabled through appropriate readers (1332) that determine location information. A controller (1336) is paired with robotics, conveyance systems, or other post processing devices to process the 3D printed object (FIG. 2, 218). Through this pairing, a host of automated processes become possible with the potential to dramatically reduce final part costs. Processes which could be automated using this approach include, but are not limited to, bed (FIG. 2, 210) unpacking, post-processing selection, post-processing (sandblasting, air-gun, water-gun, etc.), and part testing (3D scanning, mechanical testing, etc.). The automation of these operations enhances the efficiency of post processing as many of these operations are currently human controlled, that is a user collects information on what post processing operations to perform. Thus, the present system allows for a possible reduction of cost for final parts and for assurance that a part has been properly post-processed.

During post-processing, 3D printed objects (FIG. 2, 218) tagged with an identifier enable tailored post-processing for each object. This is useful given the wide variety of 3D printed objects (FIG. 2, 218) and desired final part outcomes/properties. Not only are the post processing operations to complete extracted, but the parameters are also extracted.

For example, a post processing chain may include various stages including a powder removal stage, a coloration stage, and a roughness control stage. For each 3D printed object (FIG. 2, 218), the various stages may be performed or skipped. Moreover, for each 3D printed object (FIG. 2, 218), selected stages may be entered but with different operating conditions. For example, the powder removal stage may include a low-pressure sand blast operation, a high-pressure sand blast operation, and a water picking operation. Similarly, a coloration stage may include an operation to apply a black dye and a separate operation to apply a colored dye. As yet another example, the roughness control stage may include a flash lamp smoothing operation, a ceramic tumbling operation, and a chemical polishing operation. Accordingly, each 3D printed object (FIG. 2, 218) may have a specific combination of finishing operations desired for the 3D printed object (FIG. 2, 218). Using identifiers embedded in the 3D printed object (FIG. 2, 218), an optimized finishing train could be setup which allows for automated flow of objects from one operation to another, determining the sequence to follow for each individual part. While specific reference is made to a few specific post processing operations, numerous other possible finishing processes could be included, which may depend on specific customer designations and installed finishing setup. Since triangulation of parts is possible with the usage of multiple readers, these operations could be automated using scanners plus a robotic arm or other conveyance system.

In some examples, the extractor may extract other information such as a shape of the 3D printed object (FIG. 2, 218). Extracting the shape of the 3D printed object (FIG. 2, 218) allows for the object to be unpacked from the build area without damage. For example, the location/shape may be used to determine fragile areas of the 3D printed object (FIG. 2, 218). Based on this information different unpacking operations can be executed. For example, it may be the case that fragile areas of the 3D printed object (FIG. 2, 218) are not to be handled by a robotic arm. In yet another example, the fragile area may justify less force in removing caked build material. The determination of the shape and location of the 3D printed object (FIG. 2, 218) thereby may be used to control unpacking operations. As yet another example, the shape/location that is extracted may indicate where a robotic arm can be grasped.

As yet another example, the location (e.g., the orientation) can affect the color or texture of the finished product. That is different colors or textures may be applied on surfaces with different orientations. Accordingly, the system may determine what operations should be done to modify the color or texture based on the location.

In other words, as described above, the shape and/or location of the 3D printed object (FIG. 2, 218) may be used as an input to post processing devices to alter their use. That is, operating parameters may vary based on where a 3D printed object (FIG. 2, 218) is disposed within a build area and/or its pose within the bed.

As used in the present specification and in the appended claims, the term, "extractor" refers to various hardware components, which may include a processor and memory. The processor may include the hardware architecture to retrieve executable code from the memory and execute the executable code. The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. As specific examples, the extractor as described herein may include computer readable storage medium, computer readable storage medium and a processor, and an application specific integrated circuit (ASIC).

Moreover, as used in the present specification and in the appended claims the term "extract" refers to an operation wherein information/data is pulled from the 3D printed object (FIG. 2, 218) or the database. That is, as mentioned above, data may be stored on a storage element on the 3D printed object or at a remote location identified by the storage element. Data that is extracted from either location is information that is read from those locations. For example, a database may include information, and the extractor (1334), may upon receiving an indication of the identifier, read the information from the database. That is, the identifier may point to an address in the database where the information about post processing is held, and the extractor may receive that address, locate the address on the database, and read, or extract, the contents found at that location.

The system also includes a controller (1336) to control a post processing operation based on extracted post processing operation information and the location. That is, the controller (1336) ensures that post processing operations identified via the extractor (1334) are carried out based on post processing parameters that are identified. Moreover, the location of the 3D printed object (FIG. 2, 218) is relied on such that any post processing operation is carried out without damaging the part.

In some examples, the system (1330) is disposed in an additive manufacturing device. In this example the post processing operation that is controlled includes unpacking the 3D printed object (FIG. 2, 218) from the build material in which it is disposed. That is, a 3D printed object (FIG. 2, 218) may be embedded in the build material from which it is formed. Before it can be subsequently processed it is to be unpacked.

During unpacking of the print bed (FIG. 2, 210), tagged objects (FIG. 2, 218) assist in several ways. First off, each 3D printed object (FIG. 2,218) with an embedded storage element may be read at the same time through the powder build material, since reading can be done through radio non-absorbing materials (most non-metals) like polymer and polymer powder. Accordingly, a bed (FIG. 2, 210) could be scanned with all the objects (FIG. 2, 218) being identified simultaneously. This may allow for a determination that the correct objects (FIG. 2, 218) are being unpacked, and individual objects (FIG. 2, 218) may be triangulated within a bed (FIG. 2, 210). To triangulate the location of the objects (FIG. 2, 218), the location information may be ready, or an optimized antenna design (which is printed into the object (FIG. 2, 218)) and/or multiple readers (x-, y-, and z-coordinate) can be used. Once the objects (FIG. 2, 218) are removed from the bed (FIG. 2, 210) to start the bed unpack, individual objects (FIG. 2, 218) can be identified, even with stuck-on powder.

In some examples, the unpacking instructions that are extracted include specialized, and possibly automated, unpacking instructions. This could include determining which 3D printed objects (FIG. 2, 218) to unpack first, what conditions to use for unpacking (gentle handing for fragile parts, etc.), and determining what each 3D printed objects (FIG. 2, 218) is during the unpack stage. Since individual 3D printed objects (FIG. 2, 218) can be triangulated and identified, if particular objects (FIG. 2, 218) are to undergo quicker cooling (or another specified thermal cycle), these parts could be targeted for removal from the bed prior to other objects (FIG. 2, 218).

In controlling the post processing operations, the controller (1336) may control a post processing device. For example, the controller (1336) may control a robotic arm that assists in unpacking or otherwise moving the 3D printed object (FIG. 2, 218). That is, the specialized instructions may allow for automation of unpacking, using for instance, a robotic arm. As another example, the controller (1336) may manipulate a conveyance system to move the 3D printed object (FIG. 2, 218) during unpacking from the bed (FIG. 2, 210) or following unpacking from the bed (FIG. 2, 210) for example to another location for further post processing.

In some examples, the location information that is extracted (1334) may be after an unpacking operation. For example, after a 3D printed object (FIG. 2, 218) has been removed and sand-blasted, the 3D printed object (FIG. 2,218) may be on a conveyor which takes it to different possible finishing stations. Reading an RFID chip lets the conveyor select where a particular 3D printed object (FIG. 2, 218) is to be conveyed.

In some examples, the 3D printed object (FIG. 2, 218) may include other sensors such as temperature sensors and/or humidity sensors. In this example, the extractor (1334) extracts sensor information from these sensors and the controller (1336) further controls the post processing operation based on extracted sensor information.

As a specific example, if embedded thermal sensors have been placed into the 3D printed object (FIG. 2, 218) and are powered by an RFID tag, the 3D printed object (FIG. 2, 218) could be removed once the appropriate thermal conditions were met for that part. As another example, the information from the additional sensor may even determine what post processing operations, or what parameters are to be used. That is, in some examples, the identifier may indicate what post processing operations are to be executed and may establish default parameters. However, conditions within the bed (FIG. 2, 210) during printing may affect the parameters. For example, if a temperature sensor within a 3D printed object (FIG. 2, 218) indicates a part had higher than expected thermal peaks, which may have affected object (FIG. 2, 218) strength, a lower intensity sandblasting operation may be executed.

Yet another example of a post processing operation controlled by the controller (1336) is part testing. That is, after 3D printed objects (FIG. 2, 218) have been printed, removed from the bed (FIG. 2, 210) and post-processed, testing on the 3D printed object (FIG. 2, 218) may be done. The extracted post processing information may have information predetermined about what testing procedures to implement and what outcomes of this testing are satisfactory. The results inform decisions around if quality standards are met and can allow for a fully automated QC/QA system.

In some examples, if different quality of 3D printed objects (FIG. 2, 218) are acceptable for different end uses, the post processing operation triggered may be a binning operation. That is, the 3D printed object (FIG. 2, 218) is placed in a bin based on results of testing conducted on the 3D printed object (FIG. 2, 218). In other words, the controller (1336) may bin 3D printed objects (FIG. 2, 218) based upon the output of this testing, with different parts with better performance being sent to different destinations. As a specific example, it may be that a 3D printed object (FIG. 2, 218) formed having a first ambient temperature may be stronger and thereby operates sufficiently in a high stress environment. However, a 3D printed object (FIG. 2, 218) formed having a second ambient temperature may be weaker, yet be strong enough for a lower stress environment. Accordingly, based on extracted post processing information and resulting test results, these objects (FIG. 2, 218) may be separately classified as being useful in either of the lower stress environment or the higher stress environment.

A variety of testing procedures may be extracted and triggered. Examples include, 3D-scanning of 3D printed objects (FIG. 2, 218) and correlations back to intended geometry, surface roughness of 3D printed objects (FIG. 2, 218), non-destructive mechanical testing of 3D printed objects (FIG. 2, 218) (ultra-sound or other), CT scanning of 3D printed objects (FIG. 2, 218) for internal pore structure determination and local density determination, destructive testing of test features built within a 3D printed objects (FIGS. 2, 218), and 3D printed object (FIG. 2, 218) color information. While specific reference is made to particular testing operations a variety of other testing operations may be extracted and manipulated by the controller.

Yet another post processing operation that may be triggered is an operation to write data to the storage element. For example, reports on the execution of post processing operations may be written to the storage element. As a specific example testing results may be written to the storage element. As yet another example, location information may be updated. That is, the storage element may have location information for when the 3D printed object (FIG. 2, 218) is in the build bed (FIG. 2, 210), but the location information may be updated once the 3D printed object (FIG. 2, 218) has left the build bed (FIG. 2, 210). Determining the location can be done, for instance, by having 3 RFID readers which determine the position of the object (FIG. 2, 218) in 3-dimensions, or even just 1 scanner as the part goes underneath it on a conveyor. Using a non-visual identifier such as an RFID tag may enhance the logistics of 3D printed object (FIG. 2, 218) distribution as an electronic tag is much more practical compared to a visual tag as numerous times during the described processes there could be no line-of-sight on a tag, yet information about the part location could be desirable.

Figure 14:
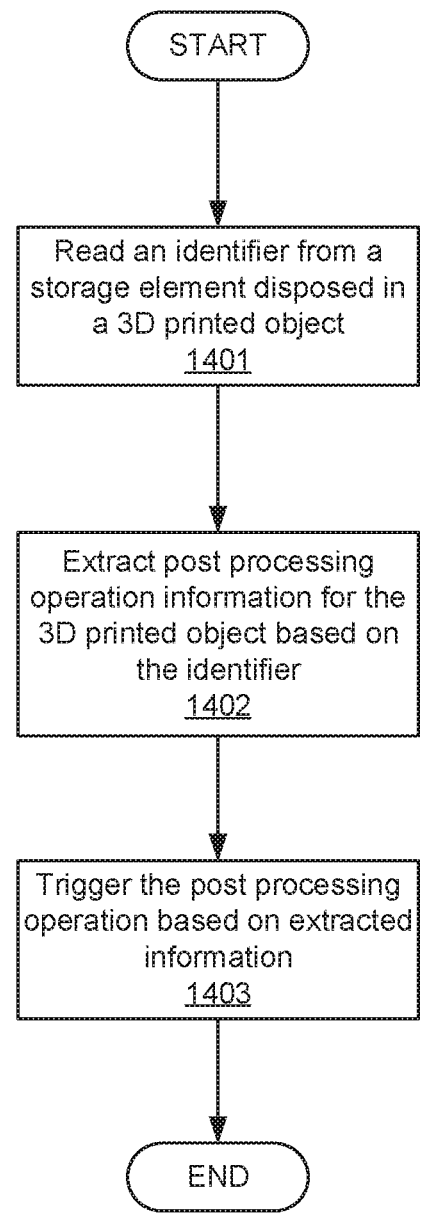
FIG. 14 is a flow chart of a method for automated handling based on part identifier and location, according to an example of the principles described herein.

FIG. 14 is a flow chart of a method (1400) for automated handling based on part identifier and location, according to an example of the principles described herein. According to the method (1400) an identifier is read (block 1401) from a storage element disposed in a 3D printed object (FIG. 2, 218). As described above this may be done in any number of ways including using an RFID scanner to interrogate an RFID storage element in the 3D printed object (FIG. 2, 218).

An extractor (FIG. 13, 1334) then extracts (block 1402) post processing operation information for the 3D printed object (FIG. 2, 218). The post processing operation information may be extracted from the storage element itself or from a database (FIG. 3, 320) associated with the 3D printed object (FIG. 2, 218). A location of the 3D printed object (FIG. 2, 218) is also acquired, either by reading it from the storage element or extracting it from a database (FIG. 3, 320) associated with the 3D printed object (FIG. 2, 218). In some examples, the location of the 3D printed object (FIG. 2, 218) is triangulated via scanners which determine the position based on reading the storage element and determining the position from the strength of the received signal. This may be done via three scanners which determine the position in three dimensions or may be done by one or two scanners when the 3D printed object (FIG. 2, 218) is constricted in different axes.

As described above, the post processing operation information may include a variety of pieces of information including testing to be done on the 3D printed object (FIG. 2, 218) and testing parameters and finishing operations.

In one particular example, if no assembly or post-processing is prescribed, or if it is planned after an initial shipping stage, 3D printed objects (FIG. 2, 218) may be left in the powder bed or with powder surrounding them. That is, the post processing operation information may indicate that the 3D printed object (FIG. 2, 218) is to remain in surrounding build material, for example during shipping. Doing so may provide protection of the part in transit to a next station or next destination for processing. In this example, the 3D printed object (FIG. 2, 218) is still identifiable as the identifier may be read through the powder build material. As a specific example, a fragile 3D printed object (FIG. 2, 218) may implement a specialized finishing stage prior to removal from the powder, yet the finishing process exists remotely from the bed (FIG. 2, 210). Accordingly, in this example, the controller (FIG. 13, 1336) may deactivate any post processing devices and the fragile 3D printed object (FIG. 2, 218) may be transmitted in the powder.

With post processing information extracted (block 1402), the relevant post processing operations are triggered (block 1403) based on the extracted information. That is, post processing is executed based on the extracted information. In some examples, triggering (block 1403) the post processing operation includes determining at least one of an unpacking order and unpacking conditions for removing the 3D printed object (FIG. 2, 218) from a build material. For example, based on the identifier or sensors disposed within the 3D printed object (FIG. 2, 218) it may be determined that certain objects (FIG. 2, 218) are to be removed first or that certain delicate procedures are followed in the removal of a particular 3D printed object (FIG. 2, 218).

Figure 15:
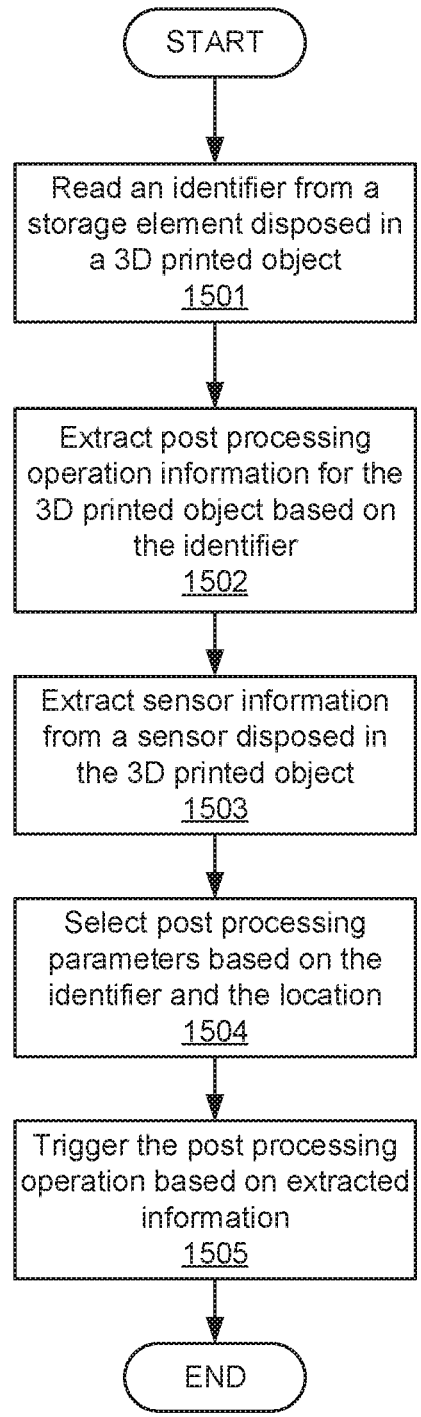
FIG. 15 is a flow chart of a method for automated handling based on part identifier and location, according to another example of the principles described herein.

FIG. 15 is a flow chart of a method (1500) for automated handling based on part identifier and location, according to another example of the principles described herein. According to the method (1500), an identifier is read (block 1501) from a storage element disposed in a 3D printed object (FIG. 2, 218) and post processing information extracted (block 1502) based on the identifier. As described above, the post processing operation information may be extracted either from the storage element or the database (FIG. 3, 320). Also, a location of the 3D printed object (FIG. 2, 218) may be extracted from the storage element or the database (FIG. 3, 320). These operations may be performed as described above in connection with FIG. 14.

As described above, in some examples, the 3D printed object (FIG. 2, 218) may have additional sensors embedded therein. Accordingly, the method (1500) further includes extracting (block 1503) sensor information from a sensor disposed in the 3D printed object and at least one of unpacking order and unpacking conditions are determined based on the sensor information. As a specific example, it may be the case that a 3D printed object (FIG. 2, 218) has a specified max temperature that it should be held below, else part quality is affected. In this example, a sensor may indicate that a temperature of the 3D printed object (FIG. 2, 218) is near the maximum temperature and that it is continuing to rise. Accordingly, based on this data, the controller (FIG. 13, 1336) may unpack this 3D printed object (FIG. 2, 218) sooner, such that it can be cooled and maintain the temperature below the maximum value.

In some examples, the method (1500) includes selecting (block 1504) a post processing parameter based on the identifier and the location. That is, as described above, the post processing operation may not only include the post processing operations to execute, but the specific parameters that are to be used during their execution. The post processing operation may then be triggered (block 1505) based on extracted information.

Figure 16:
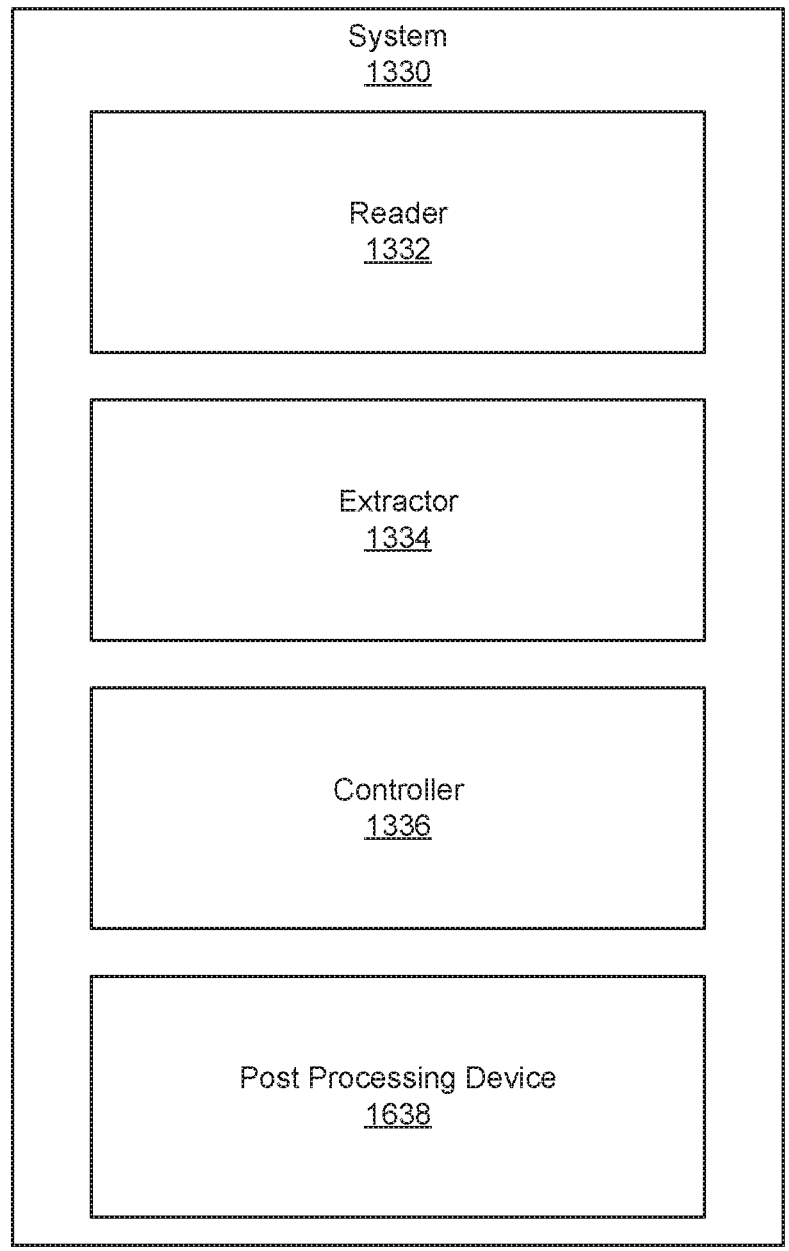
FIG. 16 is a block diagram of a system for automated handling based on part identifier and location, according to another example of the principles described herein.

FIG. 16 is a block diagram of a system (1330) for automated handling based on part identifier and location, according to another example of the principles described herein. As described above, the system (1330) includes a reader (1332) to read an identifier from a 3D printed object (FIG. 2, 218) that includes a storage element. The system (1330) also includes an extractor (1334) to extract from a database (FIG. 3, 320), a post processing operation to execute on the 3D printed object (FIG. 2, 218) as well as post processing procedures. Either the reader (1332) or the extractor (1334) also acquire a location of the 3D printed object (FIG. 2, 218) within the build material bed (FIG. 2, 210). The system (1330) also includes a controller (1336) to control a post processing device (1638) based on extracted post processing information and the location.

In this example, the system (1330) also includes the post processing device (1638) that performs the post processing operation. That is, the system (1330) may include a robotic arm, conveyor, finishing devices, etc. that carry out any of the number of post processing operations described herein.

In one particular example, the post processing device (1638) is an assembler that combines 3D printed objects (FIG. 2, 218) that do not satisfy part criteria with other 3D printed objects (FIG. 2, 218) that do satisfy part criteria to form an assembly that satisfies assembly criteria. For example, it may be the case that one 3D printed object (FIG. 2, 218) is too long by itself and that another 3D printed object (FIG. 2, 218) is too short by itself. However, when combined the two may fall within an acceptable overall assembly length range. That is, with the previous part testing information, like final geometry, being tied to each 3D printed object (FIG. 2, 218) and stored on the 3D printed object (FIG. 2, 218), opportunities may exist to match particular 3D printed objects (FIG. 2, 218) which may have slight deviations from the intended geometry but which when used in combination with other in-spec 3D printed objects (FIG. 2, 218) actually create an in-spec assembly (a part too short in one dimension paired up with a part too long in the same dimension). In other words, dimensional variance may be stored on the 3D printed object (FIG. 2, 218).

In other examples other types of variance may also be stored on a storage element on, or otherwise associated with the 3D printed object (FIG. 2, 218). For example, a 3D printed object (FIG. 2, 218) orientation and/or location within a build area may vary between print cycles, or may even vary in a single print cycle as multiple 3D printed objects (FIG. 2, 218) may be formed in a bed, but at different locations. In some cases, 3D printed objects (FIG. 2, 218) may have different properties based on their pose. As a specific example, 3D printed objects (FIG. 2, 218) may have greater tensile strength parallel to the layer places vs. perpendicular to them. Accordingly, the present system allows for part selection in multi-part assemblies specifically based on pose-related variances. Other variances of the 3D printed object (FIG. 2, 218) such as strength variation may also be stored and be used to control an assembler in selecting parts for assembly.

In another example, where the post processing device (1638) is an assembler, the system (1330) further associates the assembly with the identifier. That is, even if one RFID-tagged 3D printed object (FIG. 2, 218) is included within a larger assembly made with non-tagged objects, that entire assembly now becomes tagged and can have a directed path through the factory with the appropriate readers and automation tools (robotic arms, conveyors, etc.) in place.

Such systems and methods 1) provide a single tagging approach for 3D printed parts; 2) enhance security and authentication of 3D printed parts; 3) facilitate intelligent redesign and reconfiguring of 3D printed parts; 4) provide data gathering on part usage; 5) facilitate automation of handling of 3D printed objects; 6) allow for multiple 3D printed objects to be read simultaneously without direct line-of-sight (can be read through most non-metal materials) to the tag and through RF-transparent materials like polymers; 7) create a data-rich environment for each 3D printed object which can be added to or pulled from at any point during the object lifecycle which allows for numerous opportunities for extracting value from this data; and 8) are easily implementable. However, it is contemplated that the systems and methods disclosed herein may address other matters and deficiencies in a number of technical areas.

What is claimed is:

1. A system comprising:
   a reader to:
      read an identifier from a three-dimensional (3D) printed object that includes a storage element, the storage element storing the identifier; and
      read a location of the 3D printed object as positioned in three dimensions within a build material bed, the storage element storing the location;
   an extractor to extract, based on the identifier, a post processing operation to execute on the 3D printed object, the identifier identifying the post processing operation as specifically customized for the 3D printed object; and
   a controller to control execution of the post processing operation that is extracted upon the 3D printed object based on the location of the 3D printing object.

2. The system of claim 1, wherein:
   the system is disposed in an additive manufacturing device; and
   the post processing operation comprises unpacking the 3D printed object from a build material.

3. The system of claim 1, wherein controlling a post processing operation comprises controlling a post processing device selected from the group consisting of:
   a robotic arm; and
   a conveyance system to move the 3D printed object.

4. The system of claim 1, wherein:
   the reader is to extract sensor information from a sensor disposed within the 3D printed object; and
   the controller is to further control the post processing operation based on extracted sensor information.

5. The system of claim 1, wherein the post processing operation is a binning operation.

6. The system of claim 5, wherein the 3D printed object is placed in a bin based on results of testing conducted on the 3D printed object.

7. A method comprising:
   reading an identifier from a memory storage element disposed in a three-dimensional (3D) printed object;
   extracting, based on the identifier, post processing operation information for the 3D printed object and a location of the 3D printed object as positioned in three dimensions within a build material bed, the post processing operation information specifying a post processing operation that is customized for the 3D printed object; and
   triggering the post processing operation to be performed upon the 3D printing object based on the post processing operation information and the location.

8. The method of claim 7, wherein triggering the post processing operation comprises determining at least one of an unpacking order and unpacking conditions for removing the 3D printed object from a build material.

9. The method of claim 8:
   further comprising extracting sensor information from a sensor disposed in the 3D printed object; and
   wherein at least one of the unpacking order and unpacking conditions are determined based on the sensor information.

10. The method of claim 7, wherein the post processing operation information indicates the 3D printed object is to remain in surrounding build material during shipping.

11. The method of claim 7, wherein the post processing operation information indicates:
   testing to be done on the 3D printed object; and
   testing parameters.

12. The method of claim 7, further comprising selecting the post processing parameters based on the identifier and the location.

13. A system comprising:
   a reader to:
      read an identifier from a three-dimensional (3D) printed object that includes a storage element; and
      read a location of the 3D printed object within a build material bed;
   an extractor to extract from a database and based on the identifier;
      a post processing operation to execute on the 3D printed object; and
      post processing procedures;
   a controller to control a post processing device based on extracted post processing operation information and the location; and
   a post processing device to perform the post processing operation using the post processing parameters, wherein the post processing device is an assembler that combines parts that do not satisfy part criteria with parts that satisfy part criteria to form an assembly that satisfies assembly criteria.

14. The system of claim 13, wherein:
   the post processing device is an assembler that combines the 3D printed object with another object; and
   the system further includes a writer to associate the assembly with the identifier.

* * * * *